United States Patent
Bogard

(10) Patent No.: US 6,999,584 B1
(45) Date of Patent: Feb. 14, 2006

(54) METHOD AND APPARATUS FOR PRESENTING CONTENT DATA AND PROCESSING DATA

(75) Inventor: Daniel T. Bogard, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 497 days.

(21) Appl. No.: 09/705,580

(22) Filed: Nov. 2, 2000

(51) Int. Cl.
H04B 1/38 (2006.01)
H04M 1/00 (2006.01)

(52) U.S. Cl. .............. 379/428.01; 455/90.1; 455/566; 455/575.2; 379/430

(58) Field of Classification Search ............ 455/151.1, 455/151.4, 566, 66.1, 90.1, 344, 349, 352–355, 455/556.1, 575.2; 348/14.05, 14.07, 211.99; 379/428.92, 430
See application file for complete search history.

(56) References Cited

U.S. PATENT DOCUMENTS

| | | | |
|---|---|---|---|
| 5,001,774 A | 3/1991 | Lee | |
| 5,050,214 A | 9/1991 | Lee | |
| 5,341,254 A | 8/1994 | Ueno | |
| 5,794,127 A | 8/1998 | Lansang | |
| 5,890,074 A * | 3/1999 | Rydbeck et al. | 455/558 |
| 5,991,637 A * | 11/1999 | Mack et al. | 455/563 |
| 6,160,491 A * | 12/2000 | Kitao et al. | 340/825.69 |
| 6,567,984 B1 * | 5/2003 | Allport | 725/110 |
| 6,671,494 B1 * | 12/2003 | James | 455/66.1 |
| 6,714,233 B1 * | 3/2004 | Chihara et al. | 348/14.02 |
| 6,745,014 B1 * | 6/2004 | Seibert et al. | 455/74.1 |
| 6,754,548 B1 * | 6/2004 | Yoshii et al. | 700/94 |
| 2003/0134590 A1 * | 7/2003 | Suda et al. | 455/3.06 |

* cited by examiner

Primary Examiner—Simon Nguyen
(74) Attorney, Agent, or Firm—Garlick, Harrison & Markison, LLP; Timothy W. Markison

(57) ABSTRACT

A method and apparatus for presenting content data and processing data includes processing that begins by receiving modulated display data and content data via a channel coupling an external content processing device to a content display device. The processing continues by separating the modulated data from the content data. The processing proceeds to retrieving display data from the modulated data and processing the display data for display. The processing continues by processing the content data for presentation.

34 Claims, 21 Drawing Sheets receiving portion of transceiving module 38, 50, 76, 84, 106, 110 transmitting portion of transceiving module 38, 50, 76, 84, 106, 110

METHOD AND APPARATUS FOR PRESENTING CONTENT DATA AND PROCESSING DATA

TECHNICAL FIELD OF THE INVENTION

This invention relates generally to processing content data and in particular to processing audio data, video data, multi-media data and/or text data.

BACKGROUND OF THE INVENTION

FIG. 1 illustrates a diagram of a system 10 that includes a device 12, which may be a CD player, cassette player, DVD player, VCR, a cassette recorder, CD burner, a cellular telephone, wireless telephone and/or a combination thereof, operably coupled to headphones 14. The device 12 generates audio data that is transmitted to the headphones 14 via a left channel 20, ground 22 and a right channel 24. As such, the audio data may be provided to the headphones 14 as stereo data where left channel audio information is provided on left channel 20 and right channel audio information is provided on right channel 24 or the data may be provided as monotone audio where the same audio information is provided on both the left channel 20 and the right channel 24.

The headphone 14 may include a microphone 16 that captures audio data and provides the audio data to the device 12 via a separate wire connection labeled mic in 26. In addition, the headphones 14 may include a remote control input device 18. The type of remote control data produced by the remote control input device 18 will depend on the functionality of the device 12. For example, if device 12 is a CD player, the remote control information may be next track, pause, play, stop, volume, et cetera. Depending on the complexity of the remote control input device 18, the headphones 14 may include one to four additional wires to transmit remote control data to the device 12. These wires are labeled as remote control in 28.

The device 12 may also utilize the remote control in wires 28 to provide display information to the headphones 14. In such an embodiment, the headphones 14 would include a display for displaying such information. Display information would include, for example, volume settings, track number, et cetera. With the additional features of a microphone 16 and remote control device 18, multiple additional wires are needed to couple the headphones 14 to the device 12. The inclusion of extra wires adds to the cost, increases the complexity of manufacturing the headphones, and decreases the reliability of the headphone 14.

Therefore, a need exists for a method and apparatus that improves the processing of data and content data by a content processing device and a content display device.

DETAILED DESCRIPTION OF A PREFERRED EMBODIMENT

Generally, the present invention provides a method and apparatus for presenting content data and processing data. Such a method and apparatus includes processing that begins by receiving modulated display data and content data via a channel coupling an external content processing device to a content display device. The processing continues by separating the modulated data from the content data. The processing proceeds to retrieving display data from the modulated data and processing the display data for display. The processing continues by processing the content data for presentation. For example, if the content data is audio data, the presentation entails rendering the audio signals audible. With such a method and apparatus, remote control data, audio data, video data, text data and/or multi-media data may be transceived between a content processing device and a content display device utilizing a minimal number of interconnections.

Figure 1:
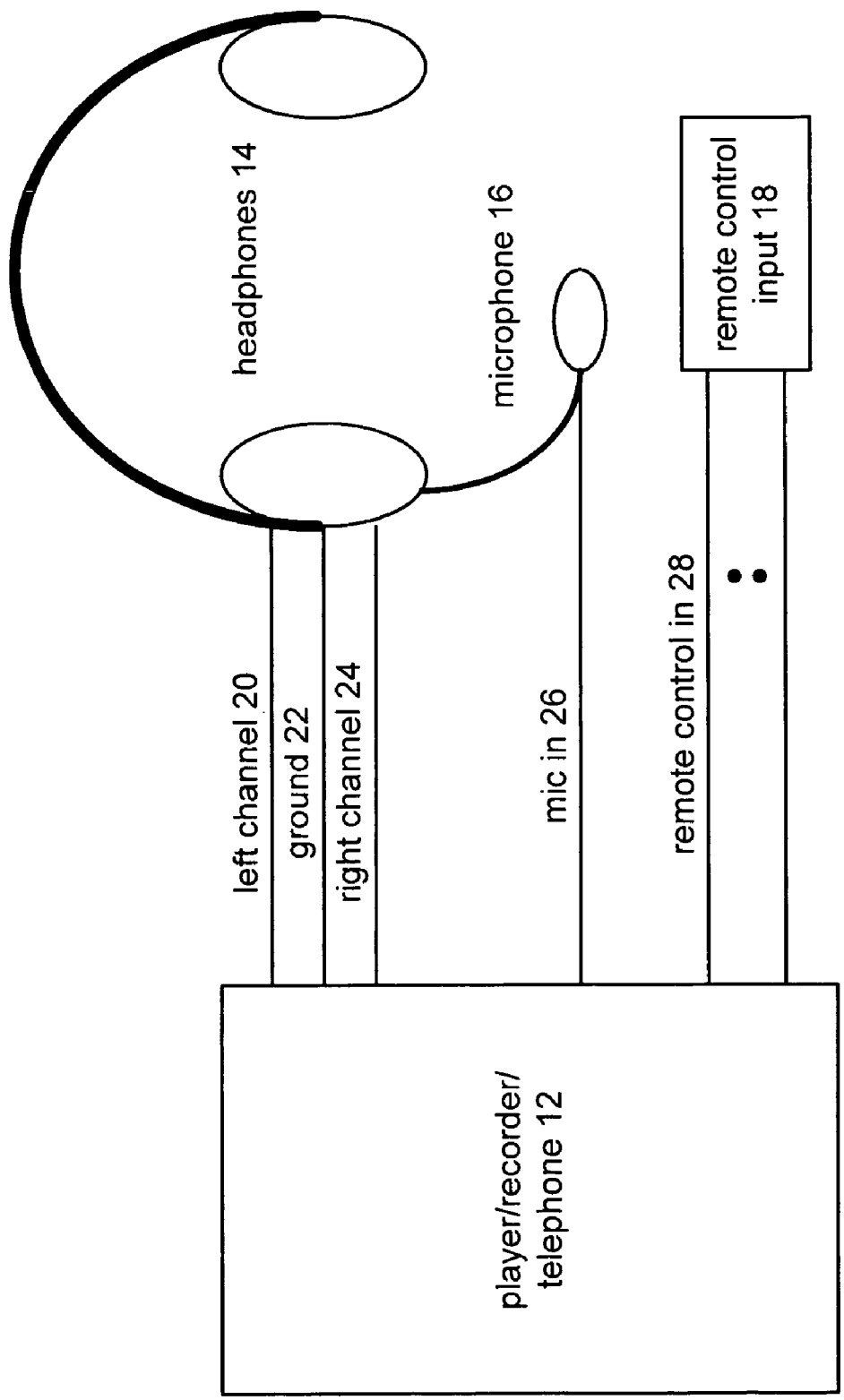
FIG. 1 illustrates a schematic block diagram of a prior art system.
Figure 2:
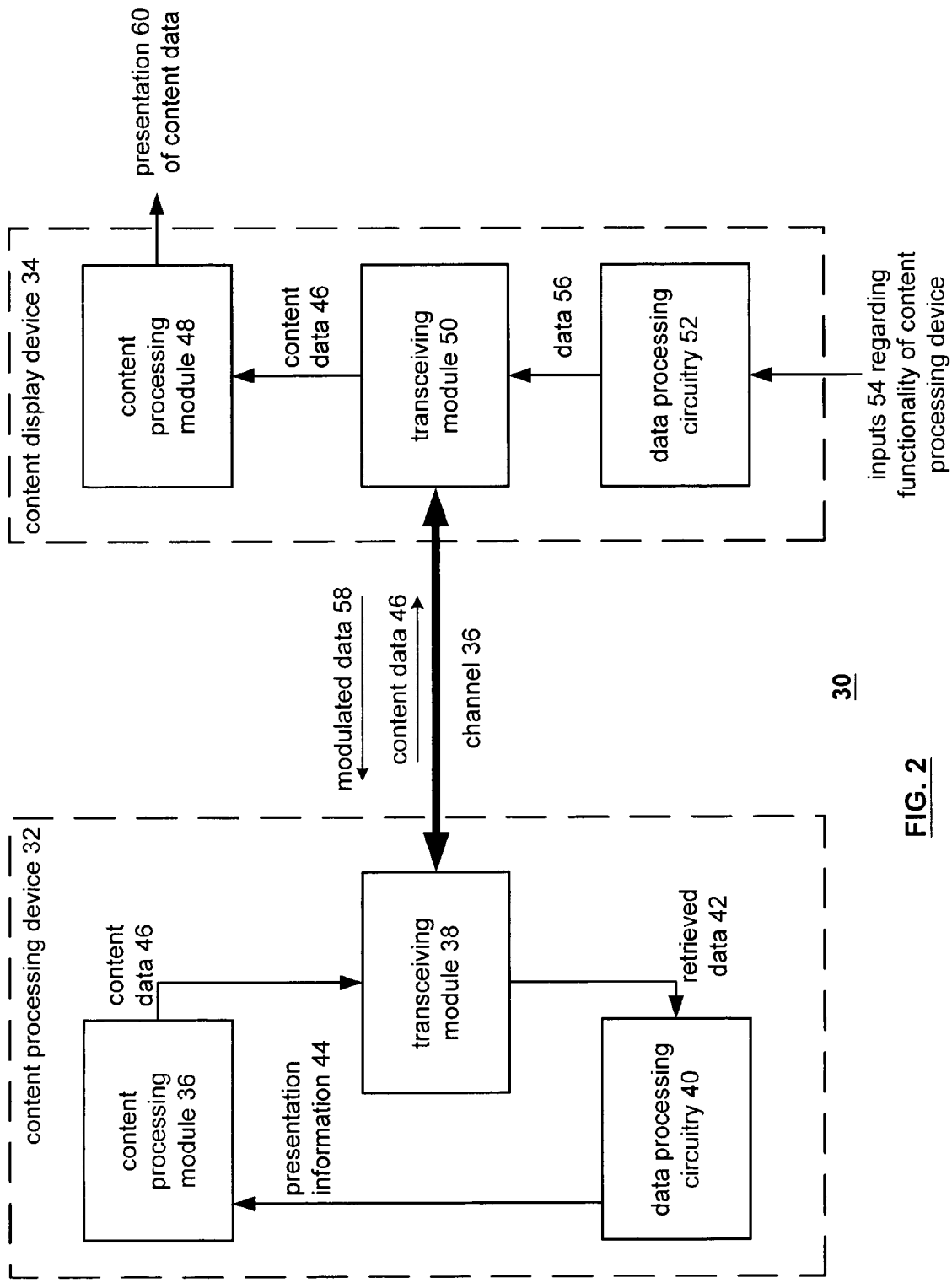
FIG. 2 illustrates a schematic block diagram of a content processing device and content display device in accordance with the present invention.

The present invention can be more fully described with reference to FIGS. 2 through 25. FIG. 2 illustrates a system 30 that includes a content processing device 32 and a content display device 34. The content processing device 32 may be any device that produces audio data, video data, text data, multi-media data, and/or a combination thereof for presentation to a user. The content display device 34 may be a headphone, LCD panel, plasma display, speakers, and/or any device that allows for audio data, video data, text data, multi-media data, and/or a combination thereof to be presented to a user.

The content processing device 32 includes a content processing module 36, a transceiving module 38 and data processing circuitry 40. The content processing module 36 generates content data 46 based on presentation information 44. The construct of the content processing module 36 is dependent on the particular type of content data 46 being generated. For example, the content data may be audio data, video data, text data, and/or multi-media data. For example, if the content data is audio data, the content processing module 36 may be a digital signal processor programmed to produce digitized audio from stored files, may be a CD drive, magnetic tape reader, DVD player, cellular telephone circuitry, wireless telephone circuitry, AM tuner circuitry, FM tuner circuitry, satellite tuner circuitry, et cetera. The presentation information 44 is representative of data provided by the content display device 34 that effects the processing of the content data 46. For example, if the content data 46 corresponds to the playback of a CD, the presentation information 44 may be volume settings, track selections, pause, play, stop, et cetera.

The transceiving module 38 is operably coupled to the content display device 34 via a channel 36. The channel 36 may be a 3 wire interface (left channel, right channel, and ground), an infrared path, a radio frequency (RF) path, a fiber optics path, and/or any interface between 2 electronic components. The transceiving module 38 is operably coupled to transmit the content data 46 to the content display device 34 and to receive modulated data 58 from the content display device 34 via the channel 36. The transceiving module 38 separates the modulated data 58 from the content data 46. In addition, the transceiving module 38 demodulates the modulated data 58 to retrieve data 42.

The data processing circuitry 40 receives the retrieved data 42 and produces there from the presentation information 44. The retrieved data 42 may be indicative of the type of content data 46 being displayed by the content display device 34. For example, if the content data 46 is audio data, the retrieved data 42 will be indicative of volume selection, tuning, et cetera.

The content display device 34 includes a content processing module 48, a transceiving module 50, and data processing circuitry 52. The data processing circuitry 52 is operably coupled to receive inputs regarding functionality of the content processing device. The inputs may be remote control inputs, audio inputs, video inputs, text inputs, et cetera. The data processing circuitry 52 interprets the inputs to generate data 56. For example, if the inputs correspond to remote control inputs, the data processing circuitry 52 includes touch panel, switches, and/or any device for receiving such user inputs and interpreting the inputs to produce data 56 that represents the particular remote control operation that has been selected. Alternatively, if the inputs correspond to audio inputs, the data processing circuitry 52 digitizes audible inputs received via a microphone such that the data 56 includes digitized audio. As a further example, if the input corresponds to a video input, the data processing circuitry 52 includes circuitry similar to a digital camera that digitizes video such that the data 56 includes digitized video.

The transceiving module 50 receives the data 56 and modulates it to produce the modulated data 58. The transceiving module 50 places the modulated data 58 on the channel 36. In addition, the transceiving module 50 receives the content data 46 via channel 36. The transceiving module 50 provides the content data 46 to the content processing module 48. The content processing module 48 interprets the content data 46 to make a presentation 60 of the content data. The content processing module 48 will be dependent on the type of content data 46 being processed. For example, if the content data 46 is audio data, the content processing module 48 corresponds to circuitry to receive analog audio signals and provide such signals to speakers or headphones. If the content data is video data, the content processing module 48 includes circuitry for rendering the content data on a LCD panel, plasma panel, et cetera. Such circuitry for rendering audio signals audible and video data visible is known, thus no further discussion will be presented except to illustrate the concepts of the present invention.

Transceiving module 38 and transceiving module 50 are operably coupled via channel 36 to convey the content data 46 and the modulated data 50. By modulating the data 56 at a frequency that is distinct from the frequency of the content data 46, the modulated data 58 and the content data 46 may be transceived utilizing the same interconnections of channel 36. For example, if channel 36 is representative of a 3-wire interface (left channel, right channel, and ground), the modulated data 58 may be modulated on the left channel at a frequency of 1 Mhz while the audio data on the left channel is in the frequency range of 20 Hz to 20 Khz. Thus, when the transceiving modules 38 and 50 process this data, they filter the modulated data 58 from the content data such that the modulated data 58 can be separately processed from the content data 46. As one of average skill in the art will appreciate, the modulated data and the content data may overlap in the frequency domain using conventional modulation schemes (e.g., CDMA).

Figure 3:
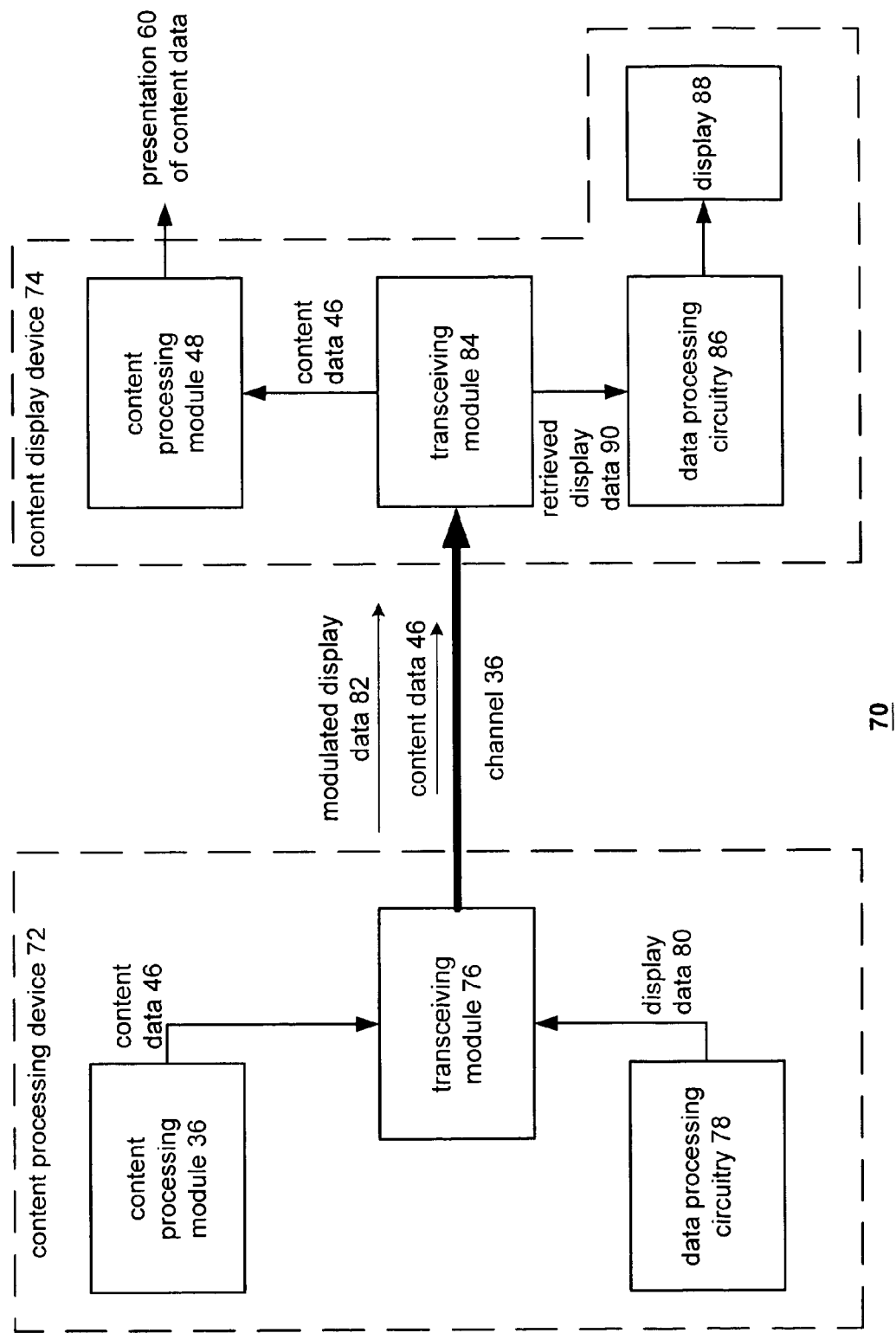
FIG. 3 illustrates a schematic block diagram of an alternate content processing device and an alternate content display device in accordance with the present invention.

FIG. 3 illustrates a schematic block diagram of an alternate system 70 that includes a content processing device 72 and a content display device 74. The content processing device 72 includes the content processing module 36, a transceiving module 76 and data processing circuitry 78. In this embodiment, the content processing module 36 generates content data 46 as previously discussed with reference to FIG. 2. The data processing circuitry 78 generates display data 80. Display data 80 may be representative of the manner in which the content data 46 is to be displayed on the content display device 74. For example, if the content data 46 corresponds to the playback of a compact disk, the display data 80 may include a volume setting, track number, et cetera. The data processing circuitry 78 includes known circuitry to generate such display data 80. For example, the circuitry to generate display data corresponding to the playback of a compact disk, playback of a cassette, playback of a DVD, playback of a video cassette, et cetera, which is known in the art. Thus, no further discussion will be presented on the construct of the data processing circuitry 78 except to illustrate the concepts of the present invention.

The transceiving module 76 receives the content data 46 and the display data 80. The transceiving module 76 modulates the display data 80 to produce modulated display data 82. The transceiving module 76 transmits the content data 46 and the modulated display data 82 to the content display device 74 via the channel 36. The modulated display data 82 is produced at a frequency that can be readily separated from the frequency of the content data 46. For example, if the content data 46 is audio data, its frequency range is 0 to 20 Khz. The modulated display data 82 may utilize a spread spectrum modulation scheme or CDMA (code division multiple access). Such a modulation scheme is well known in the art thus, no further discussion will be presented except to illustrate the concepts of the present invention.

The content display device 74 includes the content processing module 48, a transceiving module 84, data processing circuitry 86 and a display 88. The transceiving module 84 receives the modulated display data 82 and the content data 46. The transceiving module separates the content data 46 from the modulated display data 82. The content data 46 is provided to the content processing module 48, which processes the content data 46 as previously described with reference to FIG. 2. The transceiving module demodulates the modulated display data 82 to retrieve display data 90. The retrieve display data 90 is provided to the data processing circuitry 86. The data processing circuitry 86 processes the retrieved display data 90 and provides the processed data to display 88 for display. The construct of the data processing circuitry 86 will depend on the type of information to be displayed. For example, if the display data 90 corresponds to display of processing audio signals, for example, playback of a compact disk, cassette, et cetera, the display data may be digital representations of volume settings, track information, et cetera. As such, the circuitry 86 will interpret the data signals to drive an LCD display 88 or a plasma display 88. Such circuitry is known in the art, thus, no further discussion will be presented except to illustrate the concepts of the present invention.

Figure 4:
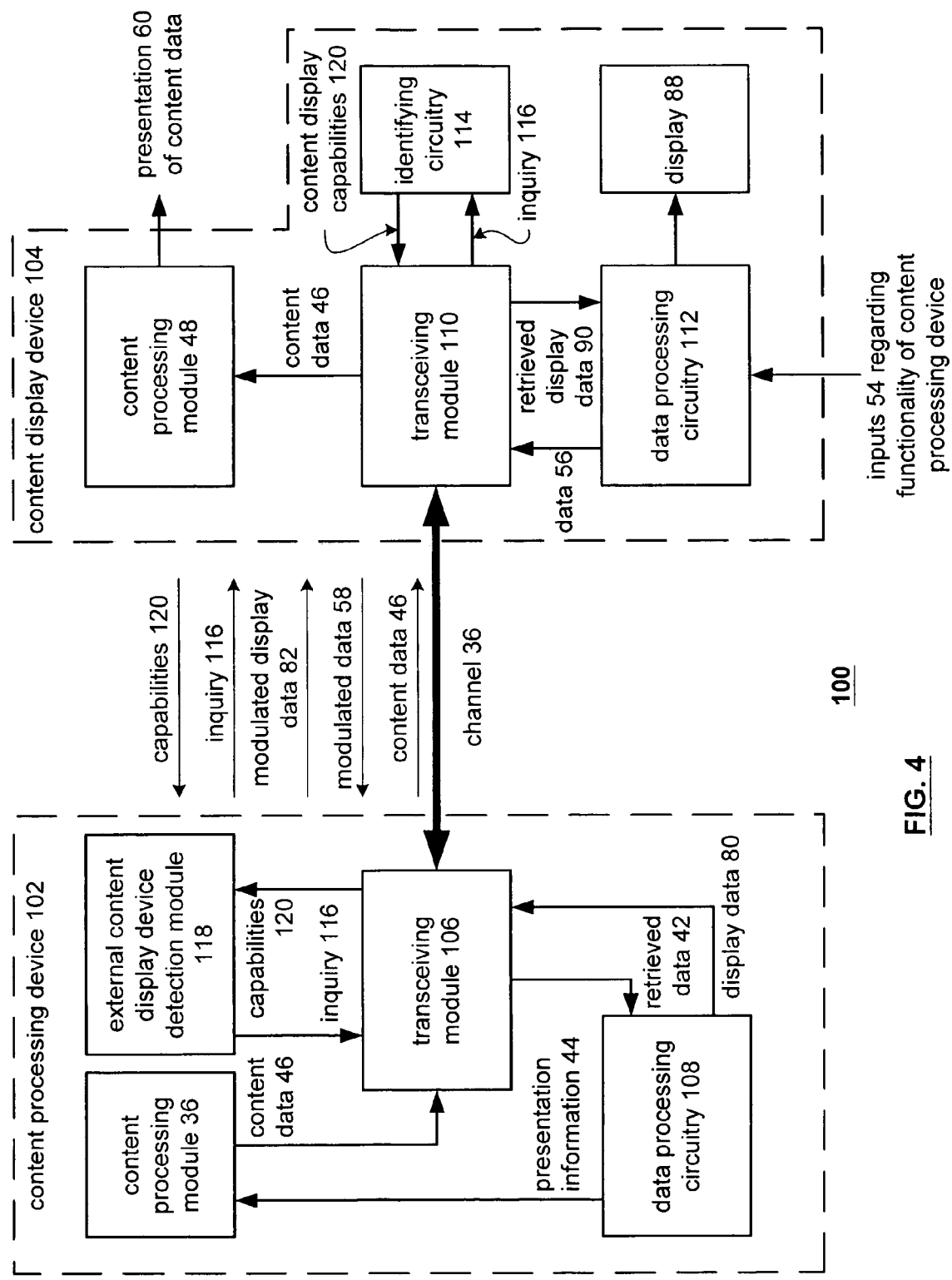
FIG. 4 illustrates a schematic block diagram of another alternate content processing device and another alternate content display device in accordance with the present invention.

FIG. 4 illustrates a schematic block diagram of another system 100 that includes a content processing device 102 and a content display device 104. The content processing device 102 includes the content processing module 36, an external content display device detection module 118, a transceiving module 106, and data processing circuitry 108. The external content display device detection module 118 generates an inquiry 116 that is provided to the transceiving module 106. The transceiving module 106 provides the inquiry 116 to the content display device 104 via channel 36. The transceiving module 110 receives the inquiry 116 and provides it to identifying circuitry 114. Identifying circuitry 114 determines the capabilities 120 of the content display device 104, which are provided to the transceiving module 110. The transceiving module 110 provides the capabilities 120 to transceiving module 106 via channel 36. The transceiving module 106 provides the capabilities 120 to the external content display device detection module 118. Based on an interpretation of the capabilities 120, the external content display device detection module 118 determines the capabilities of the content display device 104. For example, the inquiry generated by the content processing device 102 is seeking information to determine whether the content display device 104 is capable of producing remote control data, is capable of receiving display data, whether the inputs 54 are remote control inputs, video inputs and/or audio inputs, the type of display 88, and other related features of the content display device 104. The identifying circuitry 114, based on the inquiry 116, determines the capabilities 120. The determination may be done by a lookup table that includes the capabilities of the content display device 104 or an active inquiry of the content display device 104.

The content processing module 36 produces the content data 46 based on presentation information 44 as previously discussed. The data processing circuitry 108 includes the data processing circuitry 40 of FIG. 2 and the data processing circuitry 78 of FIG. 3. With such a combination of circuitry, the data processing circuitry 108 can process the retrieved data 42 to produce the presentation information 44 and also generate display data 80. The transceiving module 106 in addition to transmitting the inquiry 116 which is done prior to transmitting any content data or display data, includes the circuitry that comprises the transceiving module 38 of FIG. 2 and the transceiving module 76 of FIG. 3.

The content display device 104 includes the content processing module 48, a transceiving module 110, an identifying circuitry 114, data processing circuitry 112 and the display 88. The data processing circuitry 112 includes the data processing circuitry 52 of FIG. 2 and the data processing circuitry 86 of FIG. 3 to process the input 54 to produce data 56 and to process the retrieved display data 90. The transceiving module 100 includes the transceiving module 50 of FIG. 2 and the transceiving module 84 of FIG. 3. Note that if the content processing device 102 also includes control functions similar to the control functions of the content display device 104, one of the devices 102 or 104 will be selected to have priority.

Figure 5:
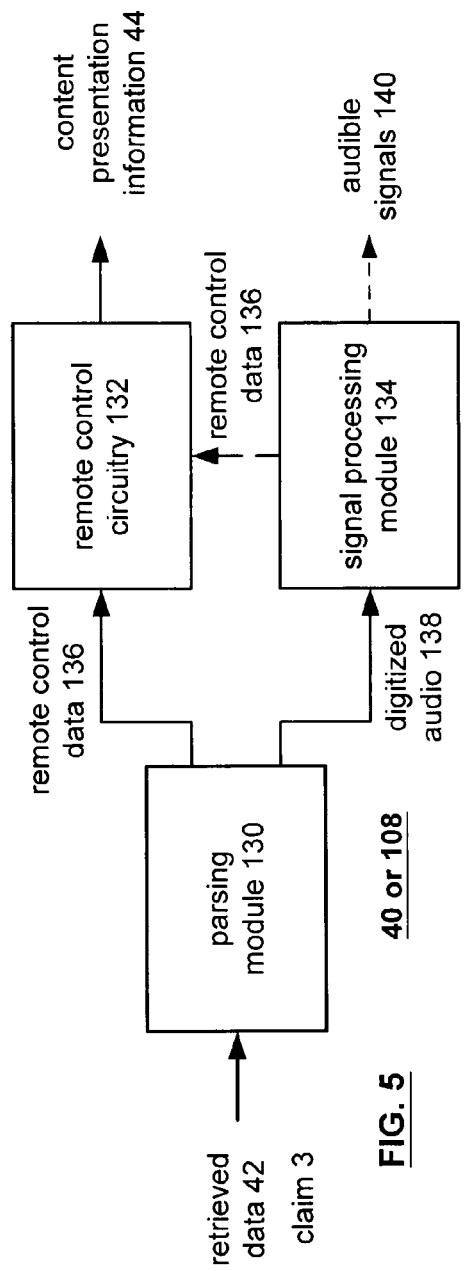
FIG. 5 illustrates a schematic block diagram of the data processing circuit of the content processing device of FIG. 2 or FIG. 4.

FIG. 5 illustrates a schematic block diagram of the data processing circuitry 40 or 108. The data processing circuitry 40 includes a parsing module 130, remote control circuitry 132 and signal processing module 134. The parsing module 130 is operably coupled to receive the retrieved data 42. The retrieved data 42 may be representative of digitized audio, digitized video, and/or incoming remote control data. In this illustration, the retrieved data 42 includes remote control data 136 and digitized audio 138. Note that the digitized audio is representative of audio signals that may be received via a microphone for recording spoken word, or may correspond to voice commands related to remote control data 136. The remote control data 136 may include volume adjustment data, stop data, play data, pause data, rewind data, fast forward data, next track data, channel up/down data, base boost data, record data, intensity data, contrast data, security access data, and/or telephone access code data.

The remote control circuitry 132 receives the remote control data 136 to produce the content presentation information 44. Based on the functionality of the content processing device, the remote control circuitry 132 will include various embodiments of circuitry. For example, if the content processing device is a audio playback device, such as a CD player, cassette player, et cetera, the remote control circuitry will receive digital representations of remote control data that corresponds to the playback of information and provides codes related thereto as to the content presentation information 44 to the content processing module 36.

The signal processing module 134 receives the digitized audio 138 and produces either remote control data 136 or audible signals 140. If the audio signals correspond to voice commands regarding the operation of the content processing device, the digitized audio signals 138 are representative of remote control information. The signal processing module 134 processes the digitized audio to produce the remote control data 136. In the alternative, the digitized audio 138 may be representative of speech that is to be rendered audible. The signal processing module 134 receives the digitized audio signals 138 and produces audible signals 140 therefrom, where the digitized audio signals 138 may be stored in the associated memory. The processing of digitized audio signals to produce audible signals is well known in the art and is found in cellular telephone technology, CD playback equipment, DVD playback equipment, et cetera.

Figure 6:
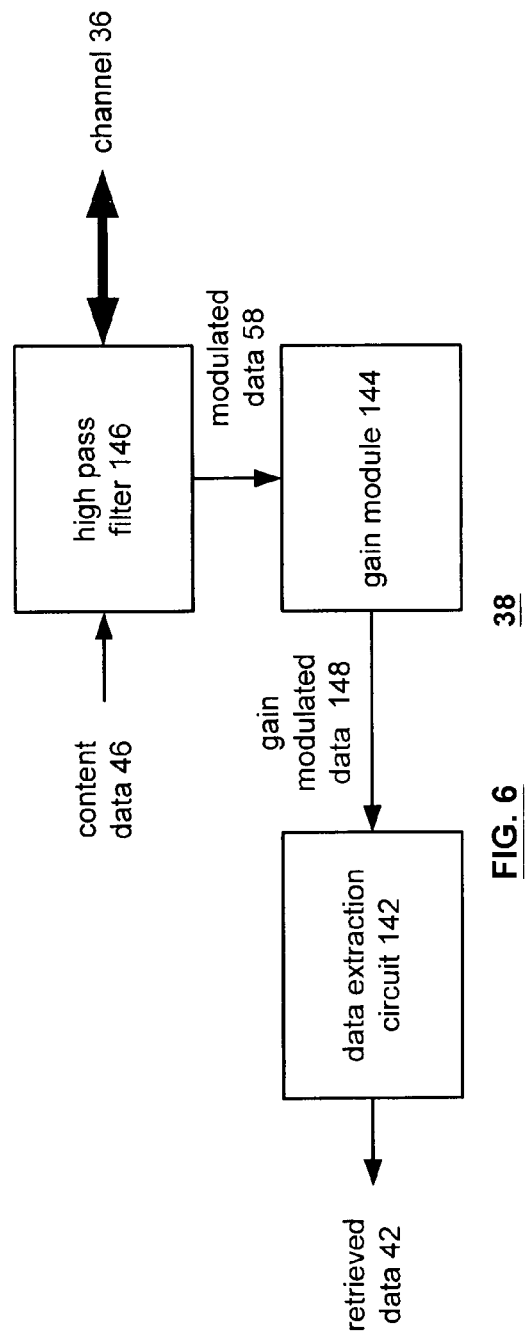
FIG. 6 illustrates a schematic block diagram of the transceiving module of the content processing device of FIG. 2.

FIG. 6 illustrates the transceiving module 38 of FIG. 2. The transceiving module 38 includes a data extraction circuit 142, a high pass filter 146 and a gain module 144. The high pass filter 146 is operably coupled to channel 36 and to receive the content data 46. The high pass filter 146 separates the content data 46 from the modulated data 58. The modulated data is provided to a gain module 144 to produce gain modulated data 148. The gain module 144 may perform a level shift of the modulated data utilizing an RS232 receiver or a universal asynchronous receiver transmitter. The data extraction circuit 142 receives the gain modulated data 148 and produces there from the retrieved data 42. The data extraction circuit 142 may be implemented in a multiple of topologies; two of which are shown in FIGS. 7 and 8.

Figure 7:
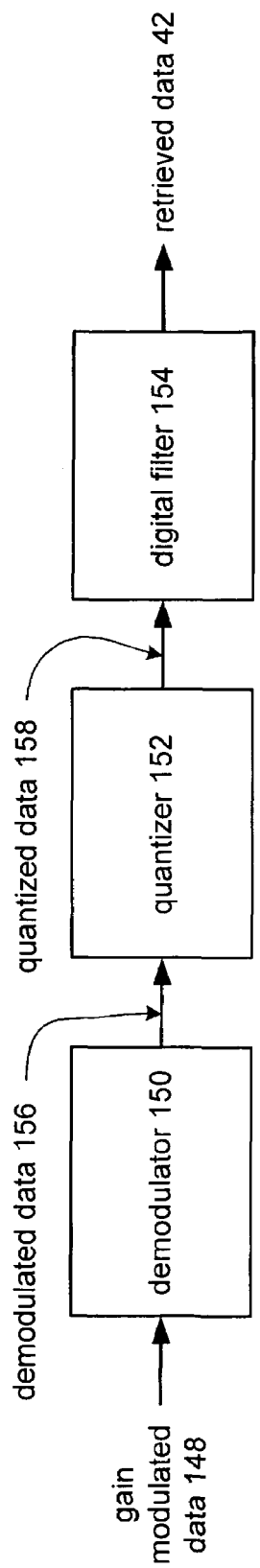
FIG. 7 illustrates a schematic block diagram of an embodiment of the data extraction circuit of FIG. 6.

FIG. 7 illustrates a schematic block diagram of the data extraction circuit 142 that includes a demodulator 150, a quantizer 152 and a digital filter 154. The demodulator 150, which may be an integrator, is operably coupled to receive the gained modulated data 148 and to produce demodulated data 156. Depending on the type of modulation that is used to produce the modulated data, the demodulator 150 will include the corresponding demodulation scheme. For example, if the modulation is done utilizing AM modulation, the demodulator will include AM demodulation, if FM modulation is used, the demodulator will include FM demodulation, if CDMA modulation is used, the demodulator 150 will include CDMA modulation.

The quantizer 152 receives the demodulated data 158 and produces quantized data 158 there from. The quantization of the demodulated data 156 is essentially a level shift function to produce the quantized data 158. The digital filter 154 receives the quantized data 158 and filters it to produce the retrieved data 42. One embodiment of the data extraction circuit 142 of FIG. 7 is shown in greater detail in FIG. 15, which will be described below.

Figure 8:
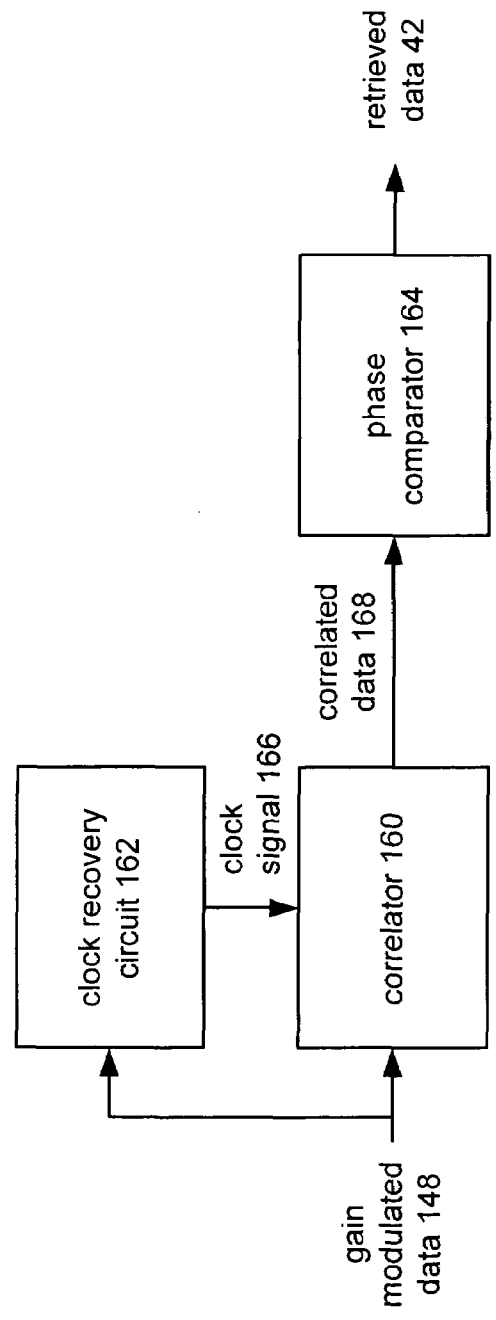
FIG. 8 illustrates a schematic block diagram of an alternate embodiment of the data extraction circuit of FIG. 6.

FIG. 8 illustrates an alternate schematic block diagram of the data extraction circuit 142. The data extraction circuit includes a correlator 160, a clock recovery circuit 162 and a phase comparator 164. The clock recovery circuit 162 is operably coupled to receive the gain modulated data 148 and to produce there from a clock signal 166. The correlator receives the gain modulated data 148 and the clock signal 166. The correlator utilizes the clock signal 166 to detect patterns of the data 42 in the gain modulated data 148 to produce the correlated data 168. The phase comparator 164 receives the correlated data 168 and produces there from the retrieved data 42. This type of data extraction is the type of data extraction typically performed to demodulate CDMA data.

Figure 9:
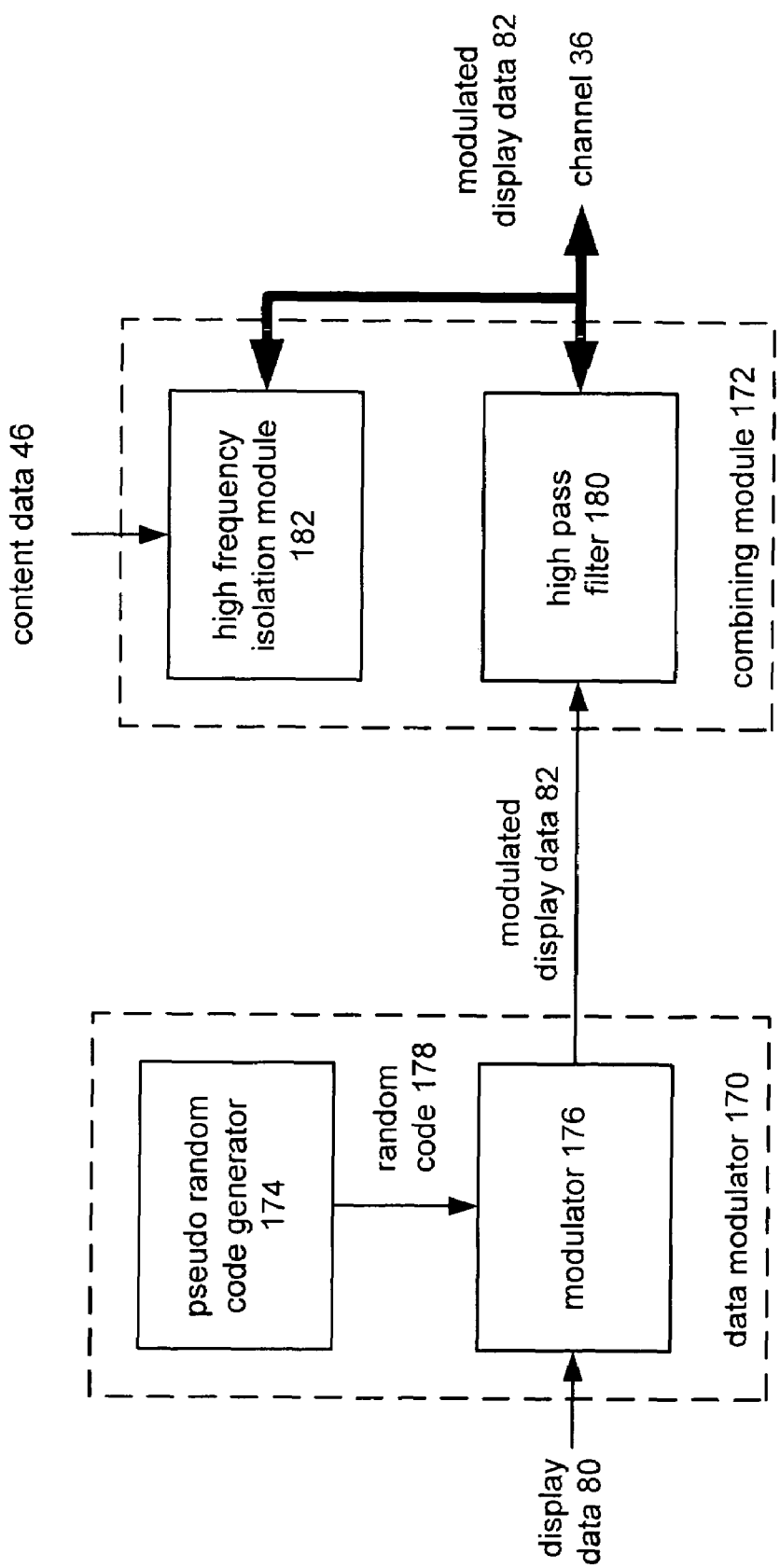
FIG. 9 illustrates a schematic block diagram of the transceiving module of the content processing device of FIG. 3.

FIG. 9 illustrates a schematic block diagram of the transceiving module 76 of FIG. 3. The transceiving module 76 includes a data modulator 170 and a combining module 172. The data modulator 170 includes a pseudo random code generator 174 and a modulator 176, which may be an AND gate and OR gate, Square Law modulator, and/or a ring modulator. The pseudo random code generator 174 generates a random code 178. The modulator 176 receives display data 80 and the random code 178. The modulator modulates the display data 80 based on the random code 178. Note that the modulator 176 may be an exclusive OR gate that receives the random code 178 via one input and the display data 80 be in another input or it may be a double balanced mixer. The modulator 176 produces the modulated display data 82 based on the random code 178 and display data 80.

The combining module 172 includes a high pass filter 180 and a high frequency isolation module 182. The high pass filter 182 and high frequency isolation module 182 are coupled to channel 36. The high pass filter 180 attenuates the content data 46 and passes the modulated display data 82 on to channel 36. The high frequency isolation module 182 passes the content data 46 while isolating it from the modulated display data 82 that is on channel 36. As such, the combining module 172 combines the content data 46 and the modulated display data 82 on to the channel 36 but separates the content data 46 from the modulated data 82 for internal processing.

Figure 10:
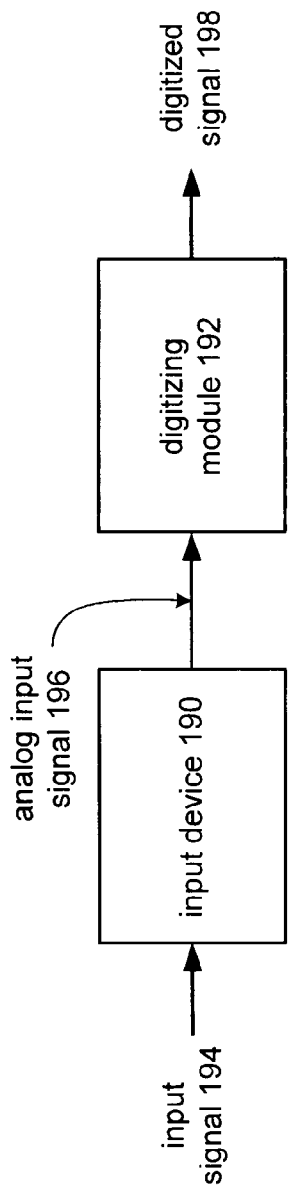
FIG. 10 illustrates a schematic block diagram of the data processing circuit of the content display device of FIG. 2 or FIG. 4.

FIG. 10 illustrates a schematic block diagram of the data processing circuitry 52 of the content display device 34 of FIG. 2. As shown, the data processing circuitry includes an input device 190 and a digitizing module 192. The input device 190 is operably coupled to receive input signals 194 which are audible analog input signals and to produce analog input signals 196. The input device 190 may be a microphone and corresponding circuitry to capture speech and produce analog input signals 196 there from. The digitizing module 192 receives the analog input signals 196 and produces there from digitized signals 198. The digitizing module 192 may include pulse code modulation digitizing circuitry and/or encryption circuitry, where such circuitry is known in the art.

Figure 11:
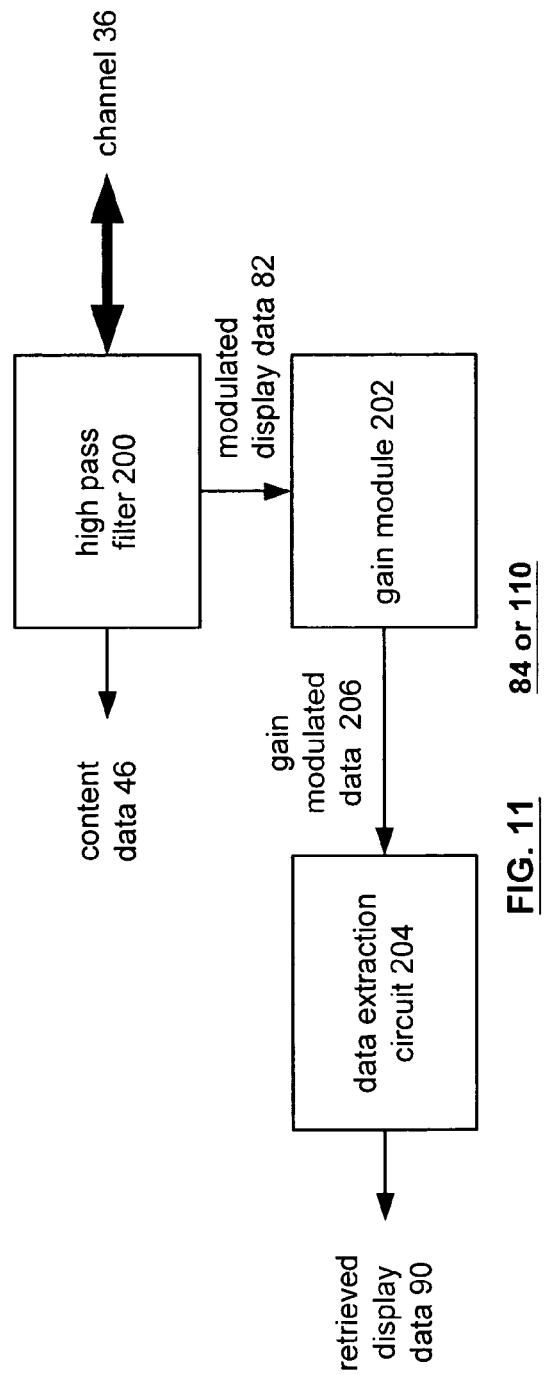
FIG. 11 illustrates a schematic block diagram of the transceiving module of the content display device of FIG. 3 or FIG. 4.

FIG. 11 illustrates a schematic block diagram of the transceiving module 84 of the content display device 74 of FIG. 3. The transceiving module 84 includes a high pass filter 200, a gain module 202 and data extraction circuit 204. The high pass filter 200 is operably coupled to channel 36 and to separate the content data 46 from modulated display data 82. The gain module 202 receives the modulated display data 82 and produces there from gain modulated data 206. The gain module 202 may be a level shift device such that the gain modulated data 206 is a level shifted representation of the modulated display data 82. The data extraction circuit 204 receives the gain modulated data 206 and produces the retrieved displayed data 90. The data extraction circuitry may be constructed in a variety of embodiments, two of which are shown in FIGS. 12 and 13.

Figure 12:
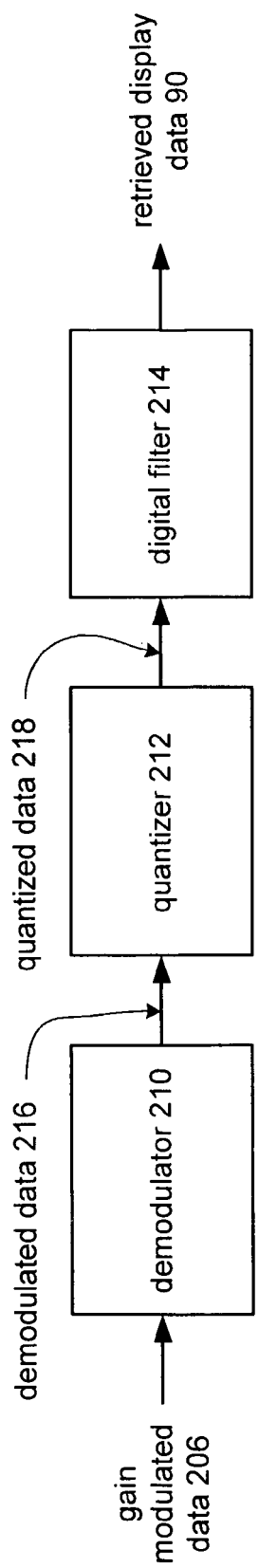
FIG. 12 illustrates a schematic block diagram of an embodiment of the data extraction circuit of FIG. 11.

FIG. 12 illustrates a schematic block diagram of the data extraction circuit 204 to include a demodulator 210, a quantizer 212 (i.e., a decision element that may be multi-state) and a digital filter 214. The demodulator 210, which may be an integrator, receives the gain modulated data 206 and produces there from demodulated data 216. The quantizer 212 receives the demodulated data 216 and produces there from quantized data 218. The digital filter 214 filters the quantized data 218 to produce the retrieved display data 90. Note that the construct of the demodulator 210 will be dependent upon the modulation scheme used to produce the modulated display data 82. If the modulation scheme is AM (amplitude modulation), the demodulator will include amplitude demodulation circuitry, if the modulation scheme was frequency modulation, the demodulator 210 will include frequency demodulation, if the modulation scheme was CDMA or CDM, the demodulator 210 will include CMDA or CDM demodulation.

Figure 13:
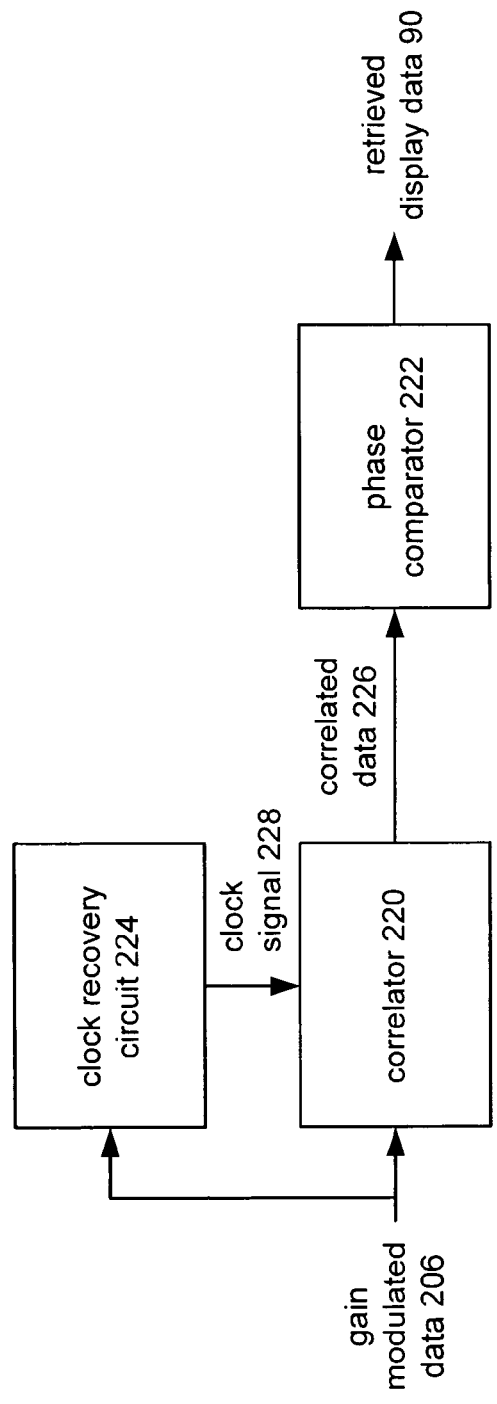
FIG. 13 illustrates a schematic block diagram of an alternate embodiment of the data extraction circuit for FIG. 11.

FIG. 13 illustrates an alternate schematic block diagram of the data extraction circuit 204. The data extraction circuit 204 includes a correlator 220, a clock recovery circuit 224 and a phase comparator 222. The correlator 220 receives the gain modulated data 206 and a clock signal 228. The clock recovery circuit 224 generates the clock signal 228 based on the gain modulated data 206 such that the clock signal 228 is representative of the period of the gain modulated data 206. Based on these inputs, the correlator 220 produces correlated data 226. The phase comparator 222 receives the correlated data 226 and produces the retrieved display data 90. The functionality of the data extraction circuit 204 corresponds to data recovery in a CDMA, a coherent FM, a phase modulation, and/or an AM encoding scheme.

Figure 14:
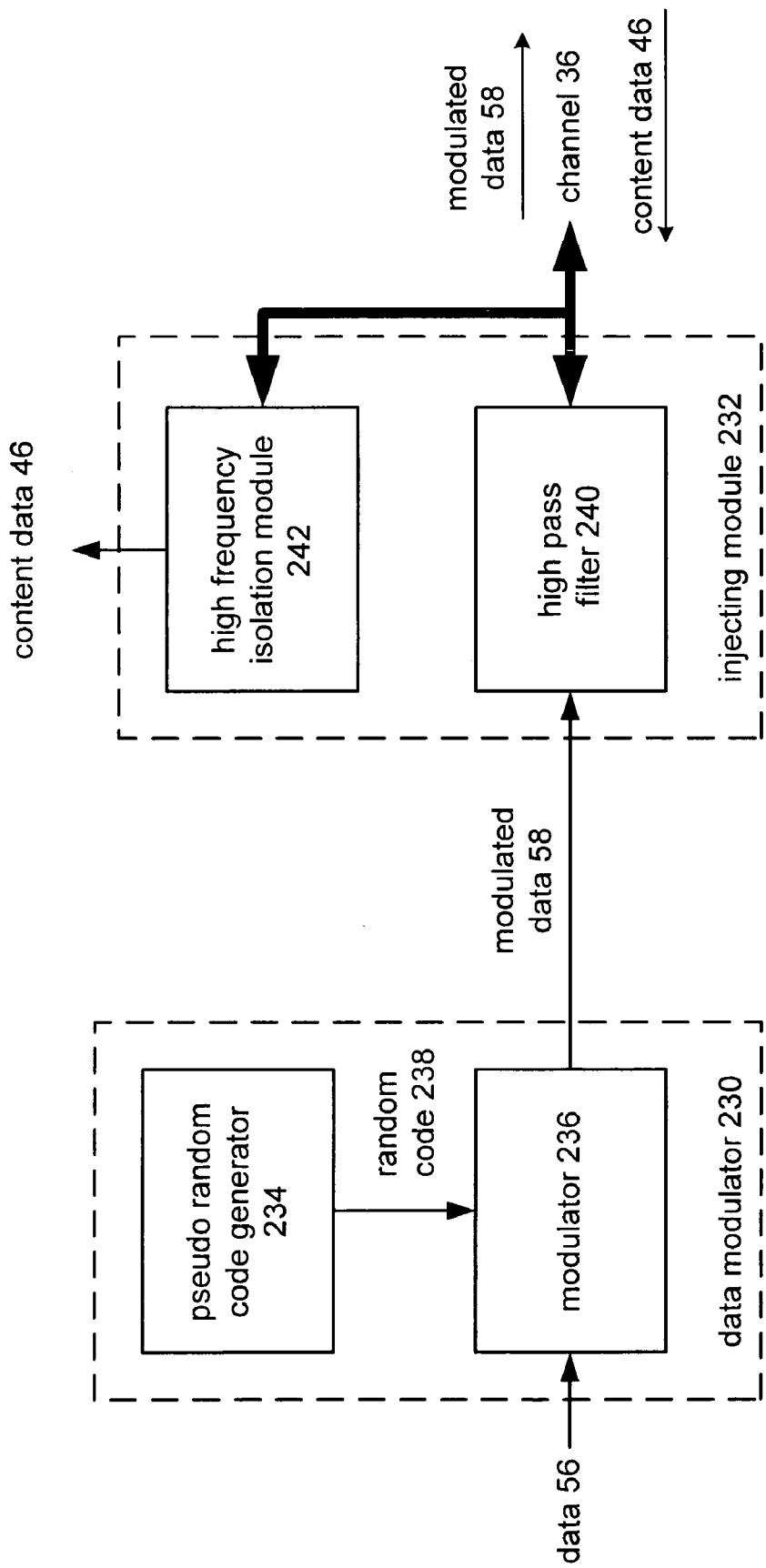
FIG. 14 illustrates a schematic block diagram of the transceiving module of the content display device of FIG. 3.

FIG. 14 illustrates a schematic block diagram of the transceiving module 84 of the content display device 74 of FIG. 3. The transceiving module 84 includes a data modulator 230 and an injection module 232. The data modulator 230 includes a pseudo random code generator 234 and a modulator 236. The pseudo random code generator 234 generates a random code 238. The modulator 236 receives data 56 and the random code 238. Utilizing the random code 238, the modulator 236 modulates data 56 to produce the modulated data 58.

The injection module 232 includes a high pass filter 240 and a high frequency isolation module 242. The high pass filter 240 and the high frequency isolation module 242 are operably coupled to channel 36. The high pass filter 240 is operably coupled to block the content data 46 from being provided to the data modulator 230 while passing the modulated data 58 onto channel 36. The high frequency isolation module 242 is operably coupled to receive the content data 46 from the channel and pass it to the content processing module 48 while attenuating the modulated data 58.

Figure 15:
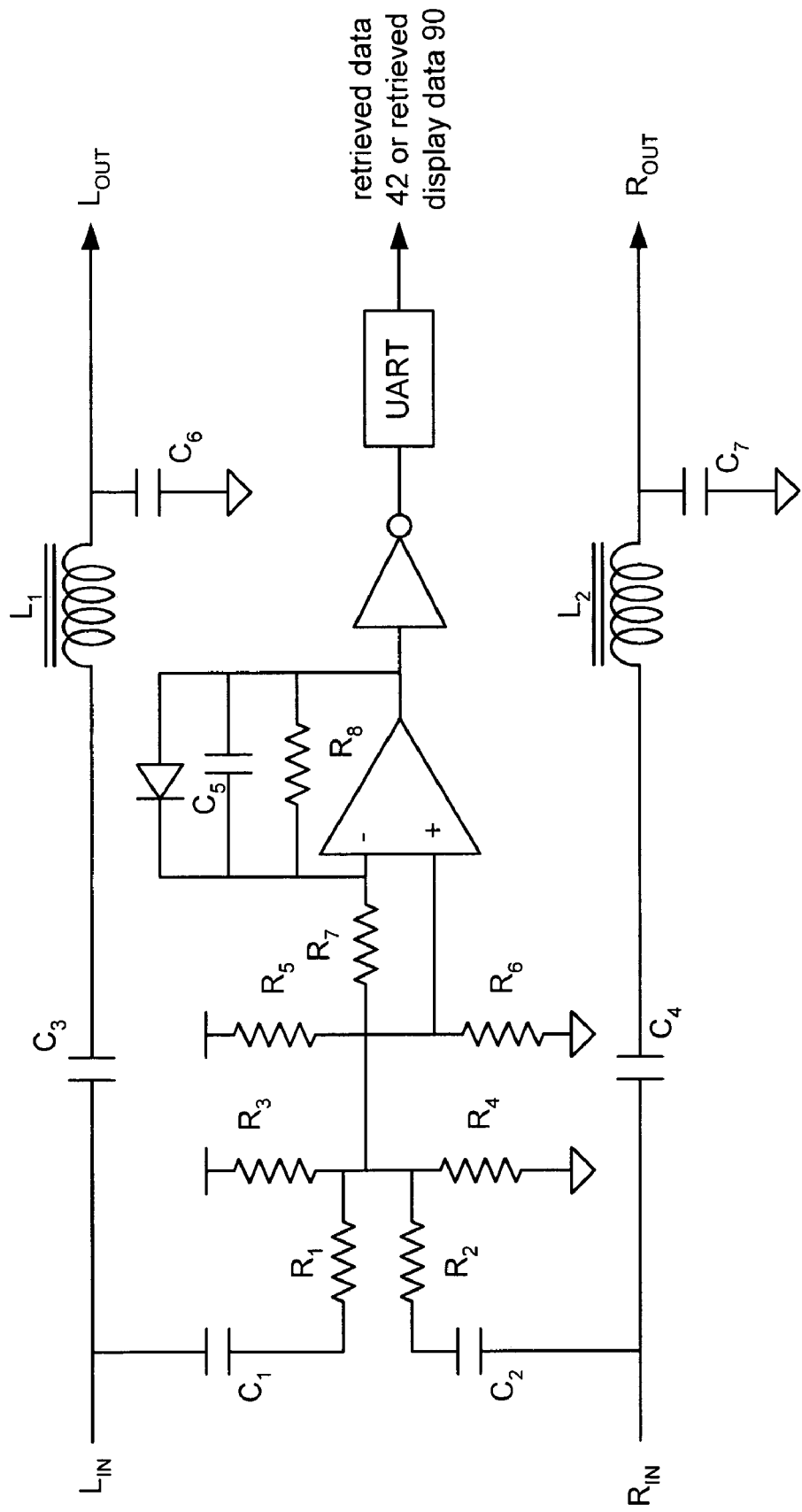
FIG. 15 illustrates a schematic block diagram of a portion of the transceiving modules for the content display device and the content processing device of FIGS. 2 through 4.

FIG. 15 illustrates a schematic diagram of the receiving portion of an embodiment of transceiving modules 38, 50, 76, 84, 106, and 110. In this embodiment, the channel includes a left channel, right channel and ground. The left channel is indicative of $L_{in}$, the right channel is represented by $R_{in}$, and the ground is represented by the ground symbol. In this illustration, capacitor $C_3$ is a DC blocking capacitor and may have a capacitance value of greater than 470 micro Farads. Capacitor $C_4$ in the right channel path performs a similar function and has a similar capacitance value as capacitor $C_4$. Inductor $L_1$ and capacitor $C_6$ in the left channel path form a high frequency isolation circuit. As such, high frequency signals that are presented on Lout, which is coupled to the channel, are blocked via the high frequency isolation circuit $L_1$ and $C_6$. As such, modulated data that may appear on the left channel on channel 36 is blocked from being received via the circuitry coupled to $L_{in}$. The inductor $L_2$ and capacitor $C_7$ perform a similar high frequency isolation for the right channel.

Capacitor $C_1$, resistor $R_1$ and resistor $R_3$ form a high pass filter for extracting modulated data from the left channel. The extracted data is provided to the integrator, which is formed by the amplifier and resistors $R_7$, $R_8$, a diode, and capacitor $C_5$. Resistors $R_5$ and $R_6$ formulate a reference potential for the amplifier. Capacitor $C_2$, resistor $R_2$ and resistor $R_4$ formulate a balancing circuit when the modulated data is on the left channel. Alternatively, if modulated data is also on the right channel, capacitor $C_2$, resistor $R_2$ and resistor $R_4$ form a high pass filter for coupling modulated data into the integrator.

The output of the integrator is provided to an inverter, which performs a level shift function that is subsequently provided to a universal asynchronous receiver transmitter (UART), which is optional. The output of the UART provides the retrieved data 42 or the retrieved display data 90.

Note that amplitude shift keying (ASK) modulation or phase modulation may be used as the modulation scheme by injected modulated data into resistor $R_7$.

Figure 16:
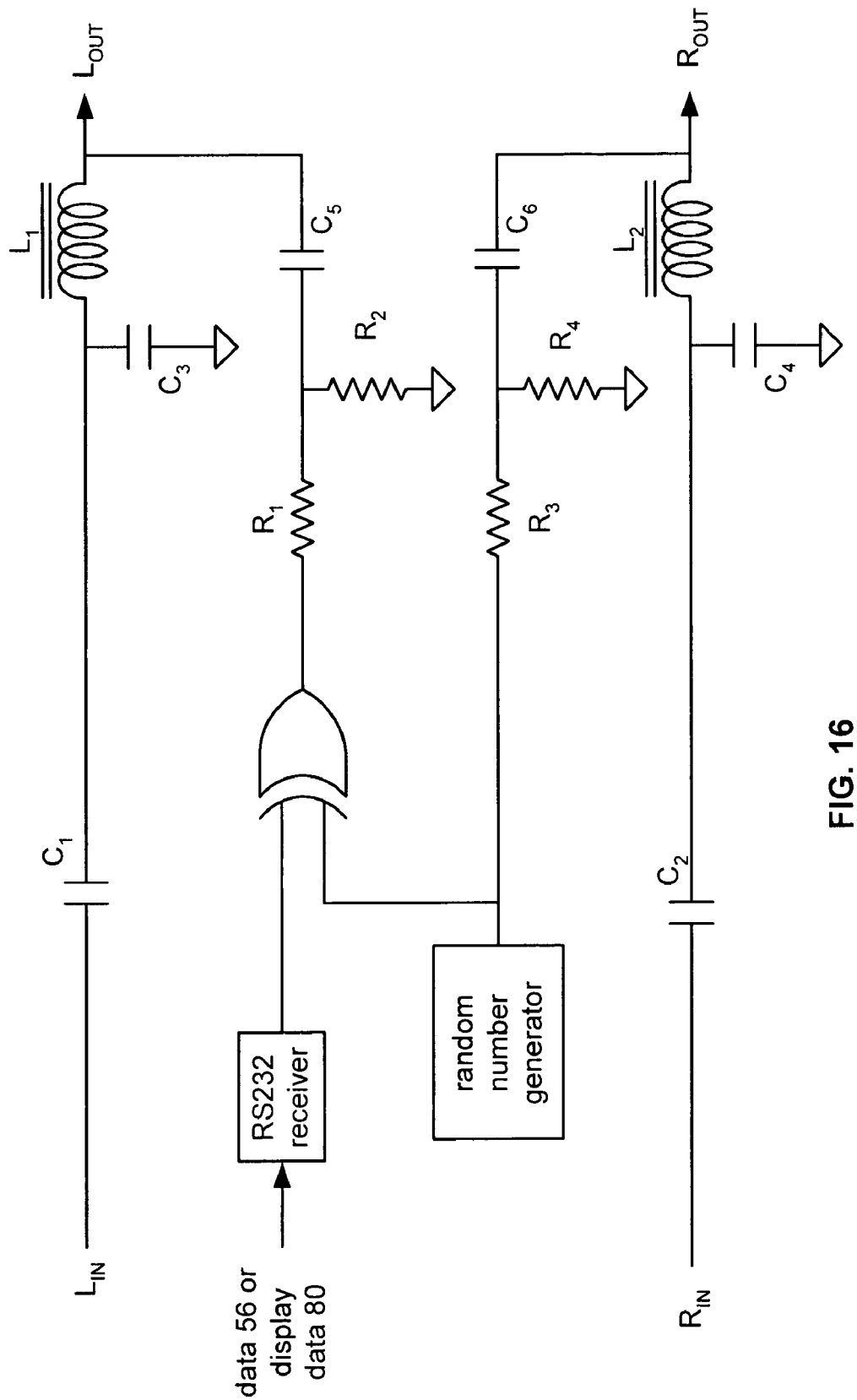
FIG. 16 illustrates a schematic block diagram of a transmitting portion of the transceiver modules of the content processing device and content display device of FIGS. 2 through 4.

FIG. 16 illustrates the transmitting portion of an embodiment of transceiving module 38, 50, 76, 84, 106, and 110. In this illustration, the channel 36 is represented by a 3-wire channel that includes a left channel, a right channel and ground. In the left channel path, $C_1$ is a DC blocking capacitor that should have a capacitance value of 470 micro Farads or greater. The capacitor $C_2$ in the right channel path performs a similar function and should have a similar capacitance value. Inductor $L_1$ and capacitor $C_3$ form a high frequency isolation circuit that blocks high frequency signals that are on the channel from being received at the input of the left channel. Inductor $L_2$ and capacitor $C_4$ perform a similar function for the right channel.

The data 56 or display data 80 is provided to an RS232 receiver, which is optional, that produces an output which is coupled to an input of an exclusive OR gate. A random number generator produces a random number that is also provided to an input of the exclusive OR gate. The exclusive OR gate modulates the display data via the random number which is capacitively coupled through $C_5$ and provided onto the left channel of channel 36. The random number is capacitively coupled via $C_6$ to the right channel out such that the random number is provided to channel 36.

Figure 17:
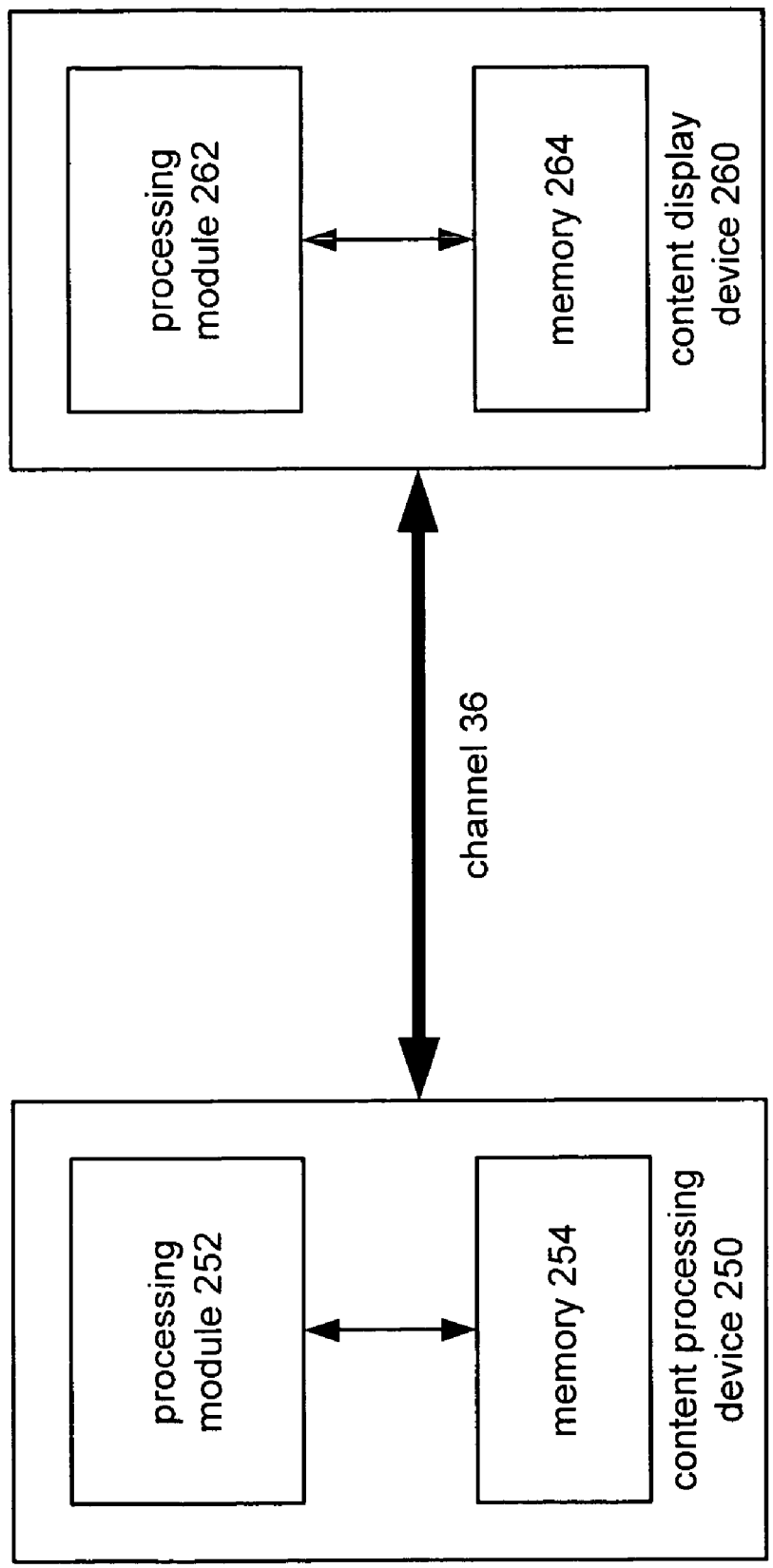
FIG. 17 illustrates a schematic block diagram of an alternate content processing device and an alternate content display device in accordance with the present invention.

FIG. 17 illustrates a schematic block diagram of an alternate content processing device 250 and an alternate content display device 260. The content processing device 250 includes a processing module 252 and memory 254. The content display device includes processing module 262 and memory 264. The processing module 252 or processing module 262 may be a single processing device or a plurality of processing devices. Such a processing device may be a microprocessor, microcontroller, digital signal processor, central processing unit, state machine, logic circuitry, and/or any device that manipulates signals (analog or digital) based on operational instructions. The memory 254 or 264 may be a single memory device or a plurality of memory devices. Such a memory device may be a random access memory, read only memory, floppy disk memory, system memory, volatile memory, non-volatile memory, and/or any device that stores digital information. Note that when the processing module 252 or processing module 262 implements 1 or more of its functions via a state machine or logic circuitry, the memory 254 or 264 storing the corresponding operational instructions is embedded within the circuitry comprising the state machine or logic circuitry. The operational instructions stored in memory 254 and 264 and executed by processing modules 252 and 262 are further discussed in FIGS. 18 through 25.

Figure 18:
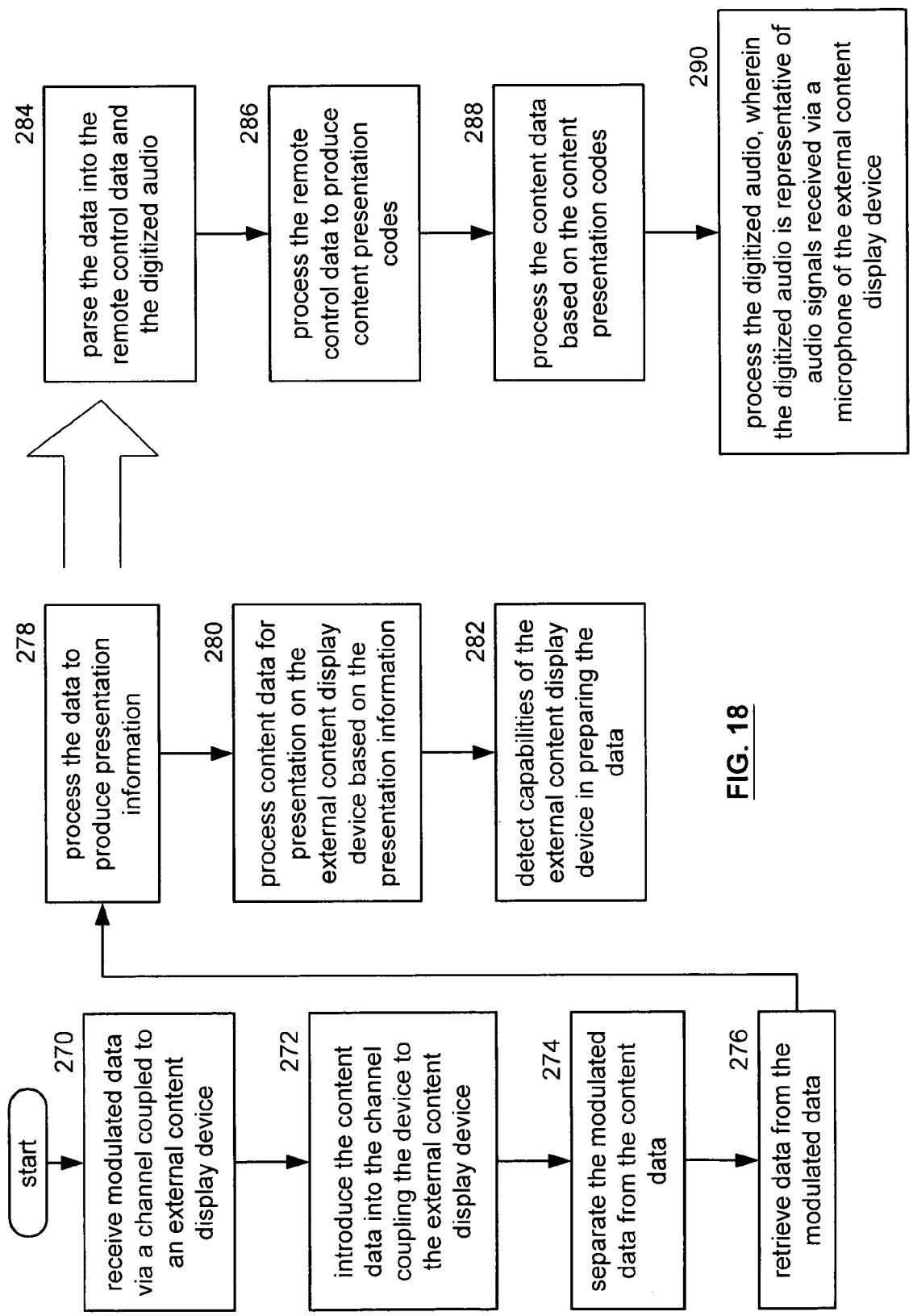
FIG. 18 illustrates a logic diagram of a method for processing content data in accordance with the present invention.

FIG. 18 illustrates a logic diagram of a method for processing content data. The process begins at 270 where modulated data is received via a channel coupling an external content display device to a content processing device. The process proceeds to Step 272 where the content data is introduced into the channel coupling the content processing device to the external content display device. The process then proceeds to Step 274 where the modulated data is separated from the content data. The process then proceeds to Step 276 where data is retrieved from the modulated data. The process then proceeds to Step 278 where the data is processed to produce presentation information. The process then proceeds to Step 280 where the content data is processed for presentation on the external content display device based on the presentation information. The process then proceeds to Step 282 where capabilities of the external content display device are detected in preparing the data.

The processing of the data to produce presentation information of Step 278 can be further described with reference to Steps 284 through Step 290. At Step 284, the data is parsed into remote control data and digitized audio. The process then proceeds to Step 286 where the remote control data is processed to produce content presentation codes, or the presentation information. The process then proceeds to Step 288 where the content data is processed based on the content presentation codes. The process then proceeds to Step 290 where the digitized audio is processed. The digitized audio is representative of audio signals received via a microphone of the external content display device.

Figure 19:
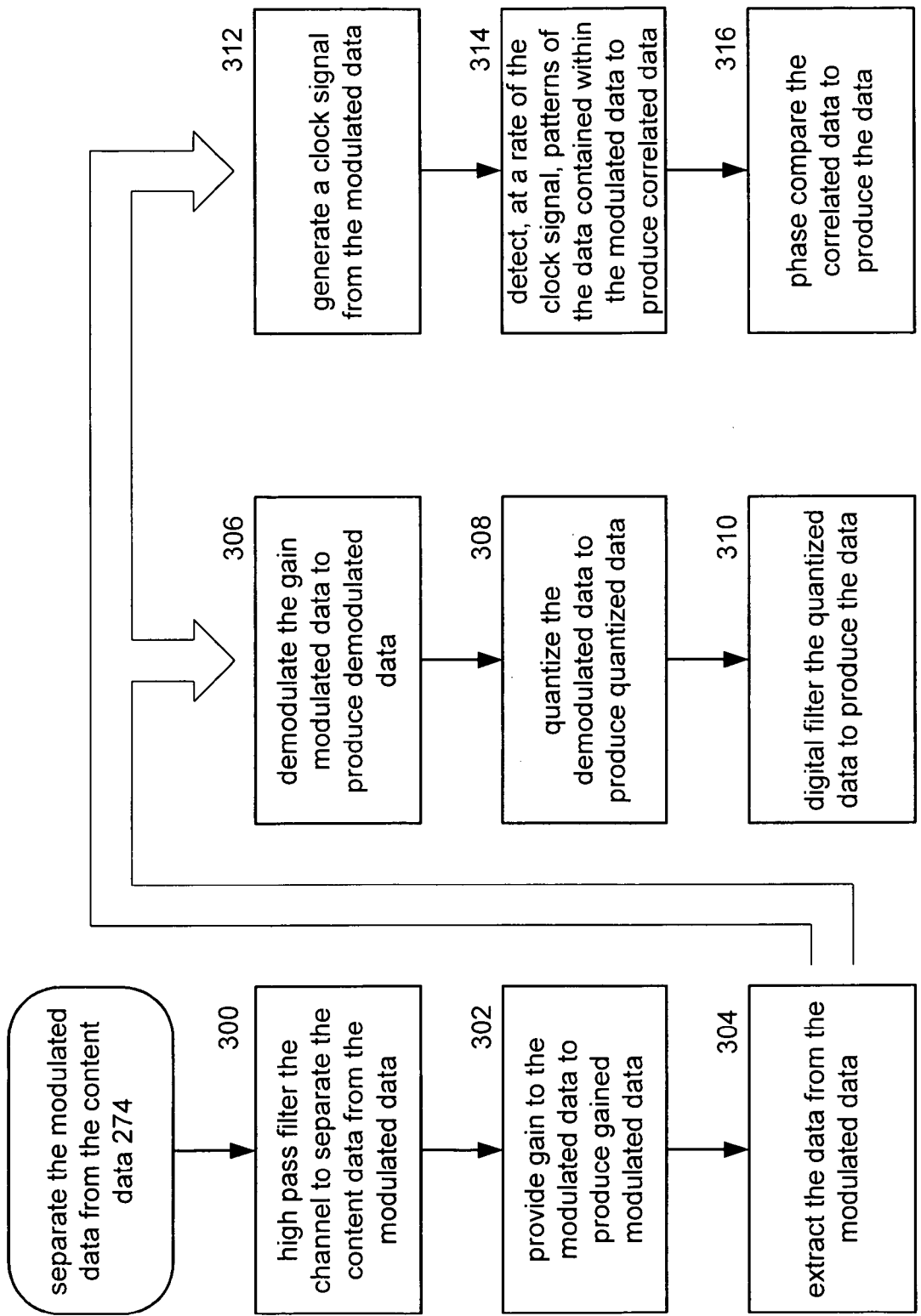
FIG. 19 illustrates a logic diagram of a method for Step 274 of FIG. 18.

FIG. 19 illustrates a logic diagram of Step 274 of FIG. 18. The processing begins at Step 300 where the channel is high pass filtered to separate the content data from the modulated data. The process then proceeds to Step 302 where gain is provided to the modulated data to produce gain modulated data. The process then proceeds to Step 304 wherein the data is extracted from the modulated data. The data may be extracted in several ways, two of which are shown in Steps 306 through 310 and Steps 312 through 316.

At Step 306, the gain modulated data is demodulated to produce demodulated data. The process then proceeds to Step 308 where the demodulated data is quantized to produce quantized data. The process then proceeds to Step 310 where the quantized data is digitally filtered to produce the data.

At Step 312, a clock signal is generated from the modulated data. The process then proceeds to Step 314 where, at a rate of the clock signal, patterns of the data is detected within the modulated data to produce correlated data. The process then proceeds to Step 316 where the correlated data is phase compared to produce the data.

Figure 20:
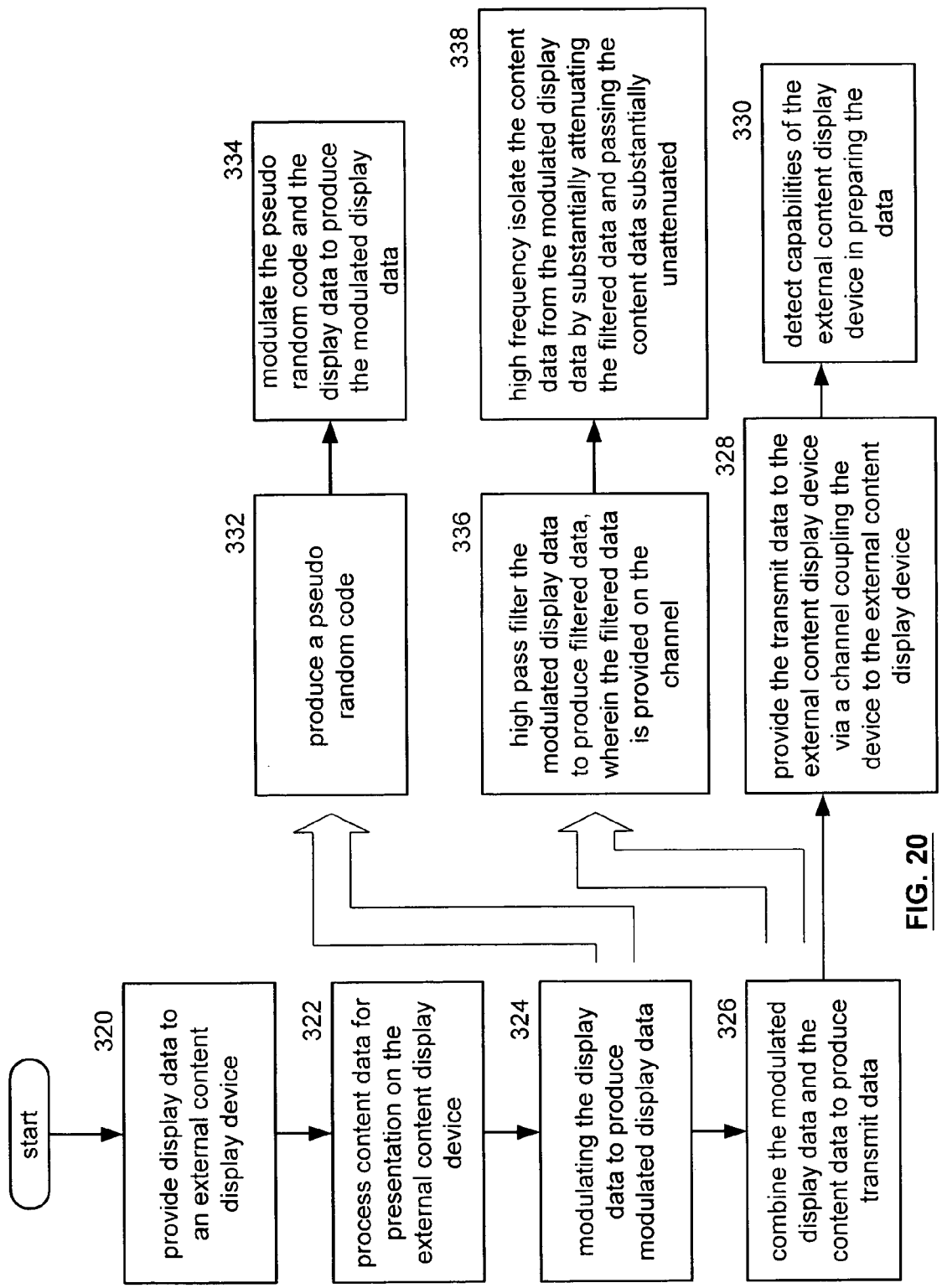
FIG. 20 illustrates a logic diagram of an alternate method for processing content data in accordance with the present invention.

FIG. 20 illustrates a logic diagram of an alternate method for processing content data in accordance with the present invention. The process begins at Step 320 where display data is provided to an external content display device. The process then proceeds to Step 322 where the content data is processed for presentation on the external content display device. The process then proceeds to Step 324 where the display data is modulated to produce modulated display data. The process then proceeds to Step 326 where the modulated data is combined with the content data to produce transmit data. The process then proceeds to Step 328 where the transmit data is provided to the external content display device via a channel coupling the content processing device to the external content display device. The process then proceeds to Step 330 where capabilities of the external content display device are detected in comparing the data.

The processing of Step 324 is further described with reference to Steps 332 and 334. At Step 332 a pseudo random code is generated. The process then proceeds to Step 334 where the pseudo random code and the display data are modulated to produce the modulated display data.

The processing of Step 326 is further described in Steps 336 and 338. At Step 336 the modulated display data is high pass filtered to produce filtered data. The filtered data is provided on the channel. The processing then proceeds to Step 338 where the content data is high frequency isolated from the modulated display data by substantially attenuating the filtered data and passing the content data substantially unattenuated.

Figure 21:
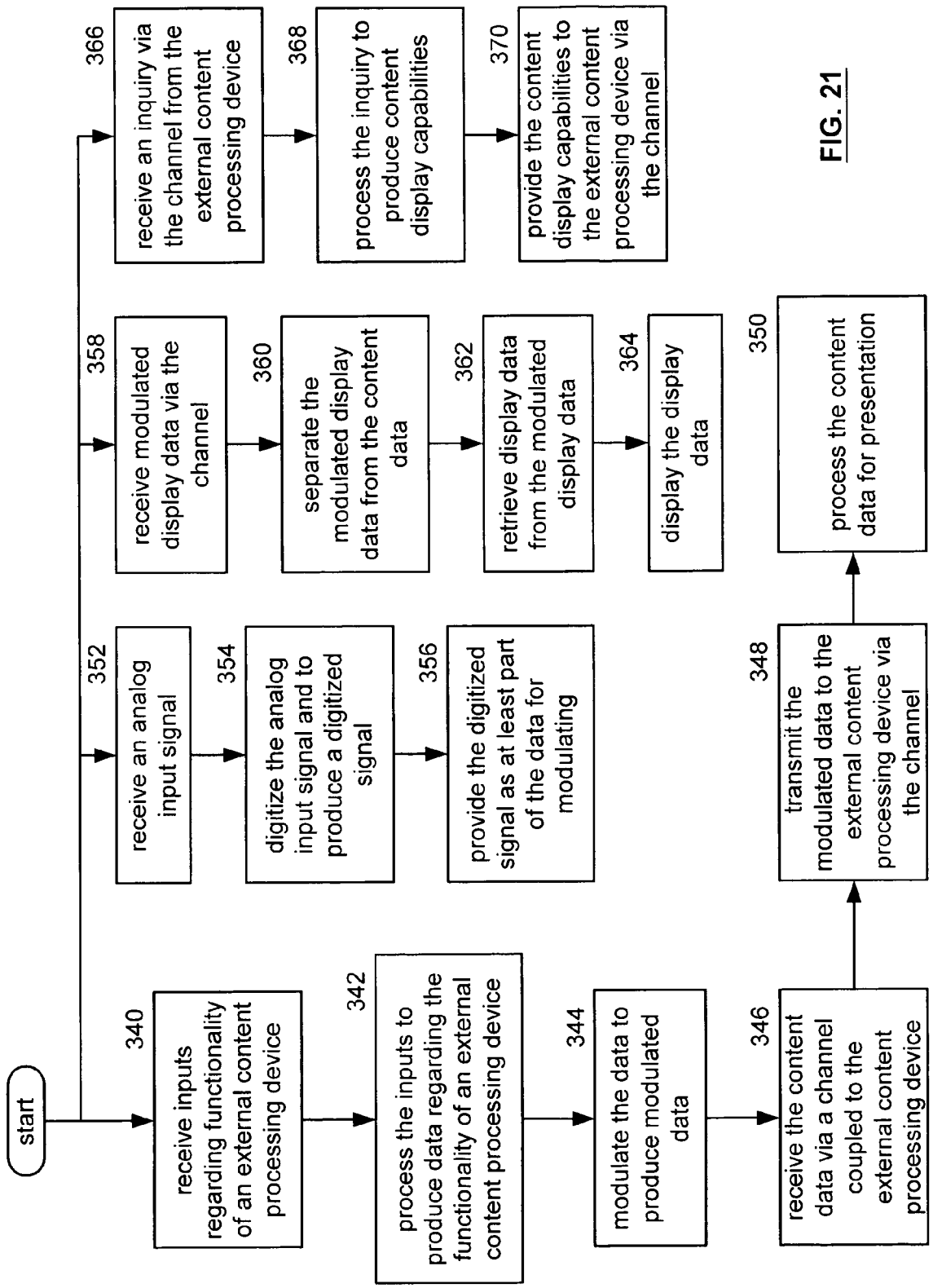
FIG. 21 illustrates a logic diagram of a method for presenting content data and processing data in accordance with the present invention.

FIG. 21 illustrates a logic diagram of a method for presenting content data and processing data in accordance with the present invention. The process begins at Steps 340, 352, 358 and 366. Each of these steps and corresponding steps are performed in parallel, however, as one of average skill in the art will appreciate, they may be performed in a serial manner and/or in any combination of a parallel or serial manner.

At Step 340, inputs are received regarding the functionality of an external content processing device. Such inputs may be indicative of volume settings, selecting tracks of a CD et cetera. The process then proceeds to Step 342 where the inputs are processed to produce data regarding the functionality of an external content processing device. The process then proceeds to Step 344 where the data is modulated to produce modulated data. The process then proceeds to Step 346 where the content data is received via a channel coupled to the external content processing device. The process then proceeds to Step 348 where the modulated data is transmitted to the external content processing device via the channel. The process then proceeds to Step 350 where the content data is processed for presentation.

At Step 352 an analog input signal is received. The process then proceeds to Step 354 where the analog input signal is digitized to produce a digitized signal. The process then proceeds to Step 356 where the digitized signal is provided as at least part of the data from modulating. As such, the digitized signal will be modulated and provided to the content processing device via the channel.

At Step 358, modulated display data is received via the channel. The process then proceeds to Step 360 where the modulated display data is separated from the content data. The process then proceeds to Step 362 where display data is retrieved from the modulated display data. The process then proceeds to Step 364 where the display data is displayed.

At Step 366, an inquiry is received via the channel from the external content processing device. The process then proceeds to Step 368 where the inquiry is processed to produce content display capabilities. The process then proceeds to Step 370 where the content display capabilities are provided to the external content processing device via the channel.

Figure 22:
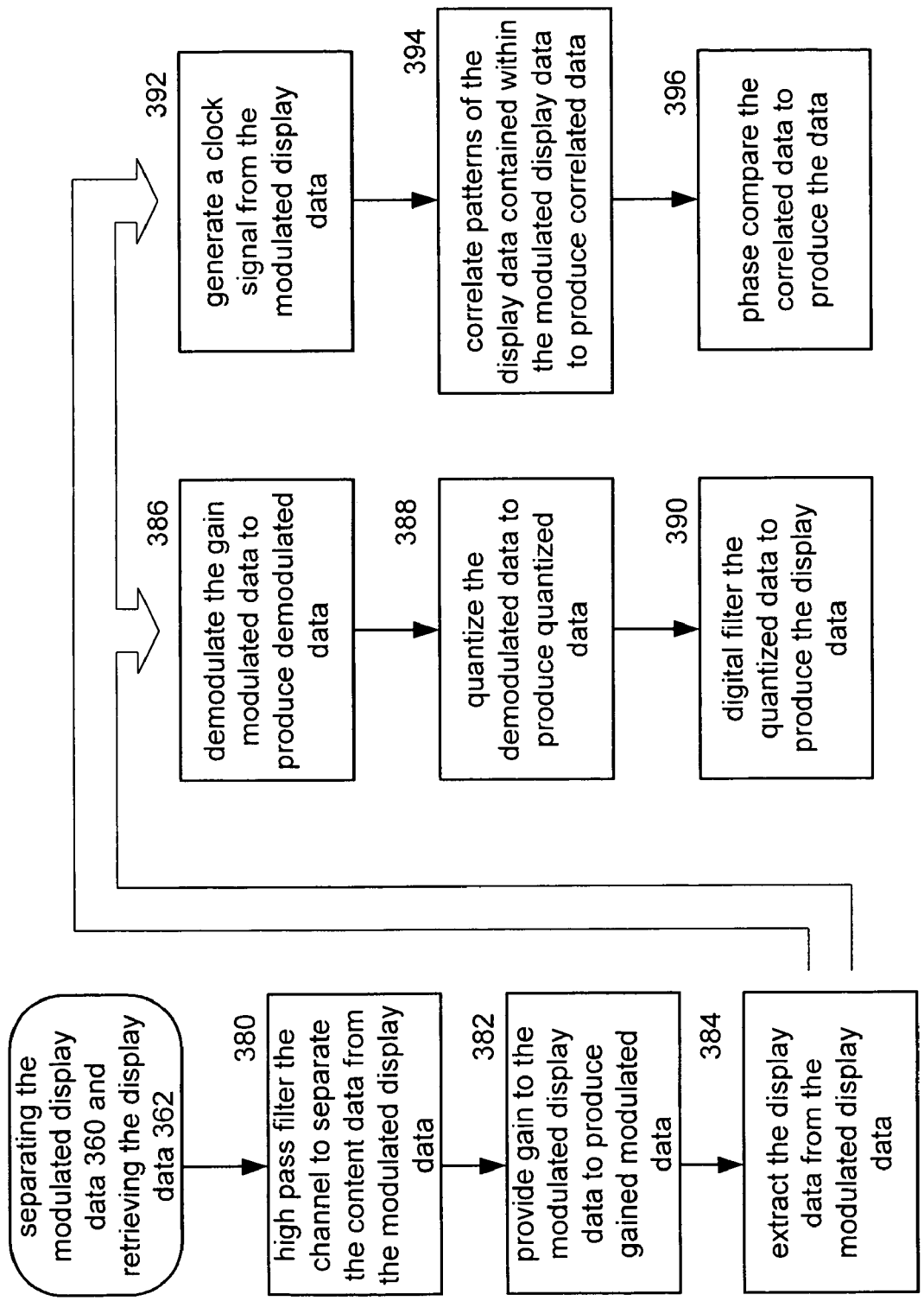
FIG. 22 illustrates a logic diagram of a method for Steps 360 and 362 of FIG. 21.

FIG. 22 illustrates a logic diagram of further processing of Steps 360 and 362 of FIG. 21. The processing begins at Step 380 where the channel is high pass filtered to separate the content data from the modulated data. The process then proceeds to Step 382 where gain is provided to the modulated data to produce gain modulated data. The process then proceeds to Step 384 where the display data is extracted from the modulated display data. The extracting of the display data may be done in a variety of ways, two of which are shown in Steps 386 through 390 and Steps 392 through 396.

In Step 386, the gain modulated data is demodulated to produce demodulated data. The process then proceeds to Step 388 where the demodulated data is quantized to produced quantized data. The process then proceeds to Step 390 where the quantized data is digitally filtered to produce the display data.

At Step 392, a clock signal is generated from the modulated display data. The process then proceeds to Step 394 where patterns of the displayed data are correlated with patterns contained within the modulated display data to produce correlated. The process then proceeds to Step 396 where the correlated data is phased compared to produce the data.

Figure 23:
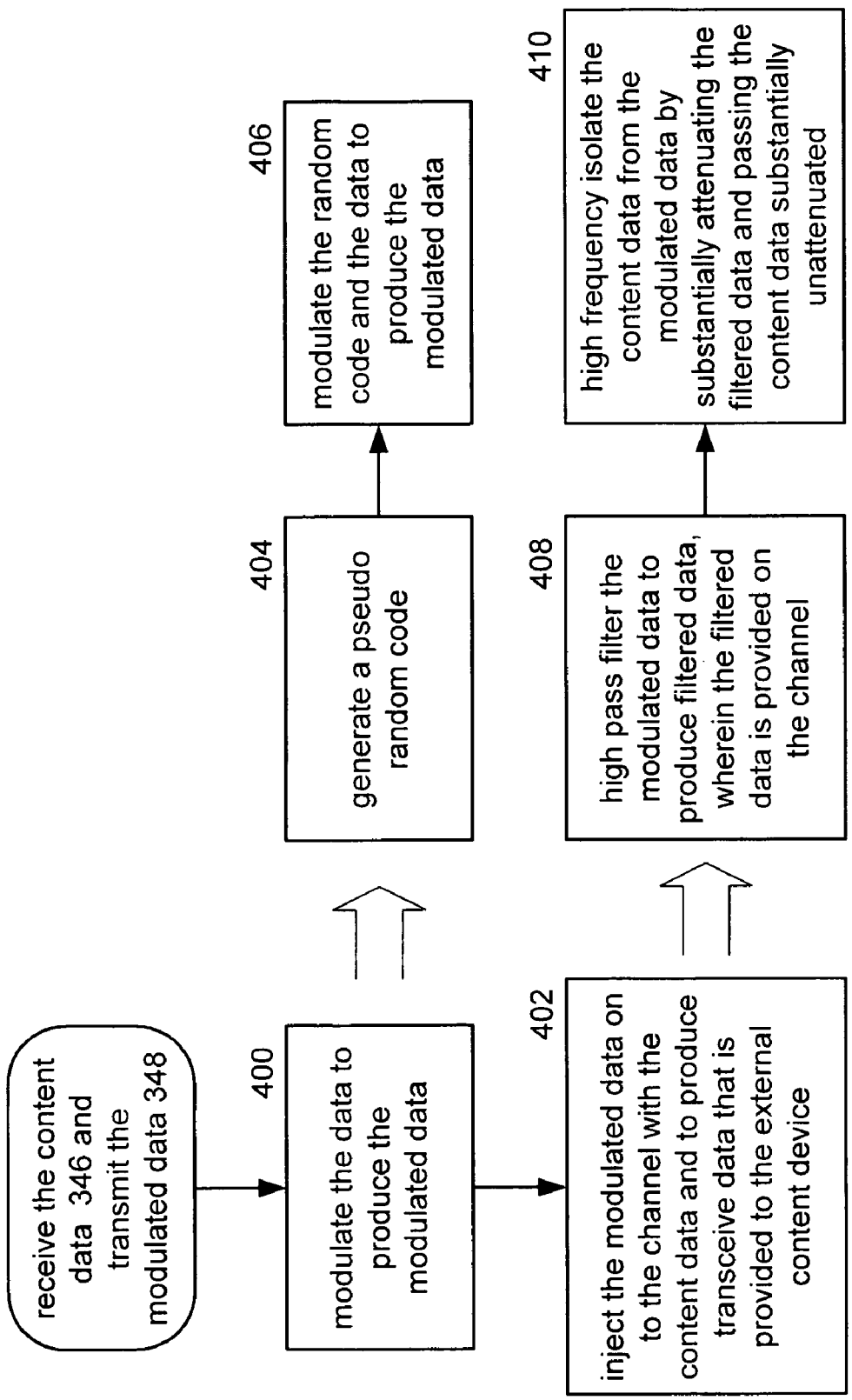
FIG. 23 illustrates a logic diagram of a method for Steps 346 and 348 of FIG. 21.

FIG. 23 illustrates the further processing of Steps 346 and 348 of FIG. 21. Such further processing begins at Step 400 where the data is modulated to produce modulated data. This may be done by generating a pseudo random code as shown at Step 404. After generating the pseudo random code, the process would proceed to Step 406 where the random code and the data are modulated to produce the modulated data.

Returning to the main flow, the process proceeds to Step 402 where the modulated data is injected onto the channel with the content data to produce transceived data. The transceived data is provided to the external content processing device. Step 402 is shown in further detail with respect to Steps 408 and 410. At Step 408, the modulated data is high pass filtered to produce filtered data. The filtered data is provided on the channel. The process then proceeds to Step 410 where the content data is high frequency isolated from the modulated data by substantially attenuating the filtered data and passing the content data substantially unattenuated.

Figure 24:
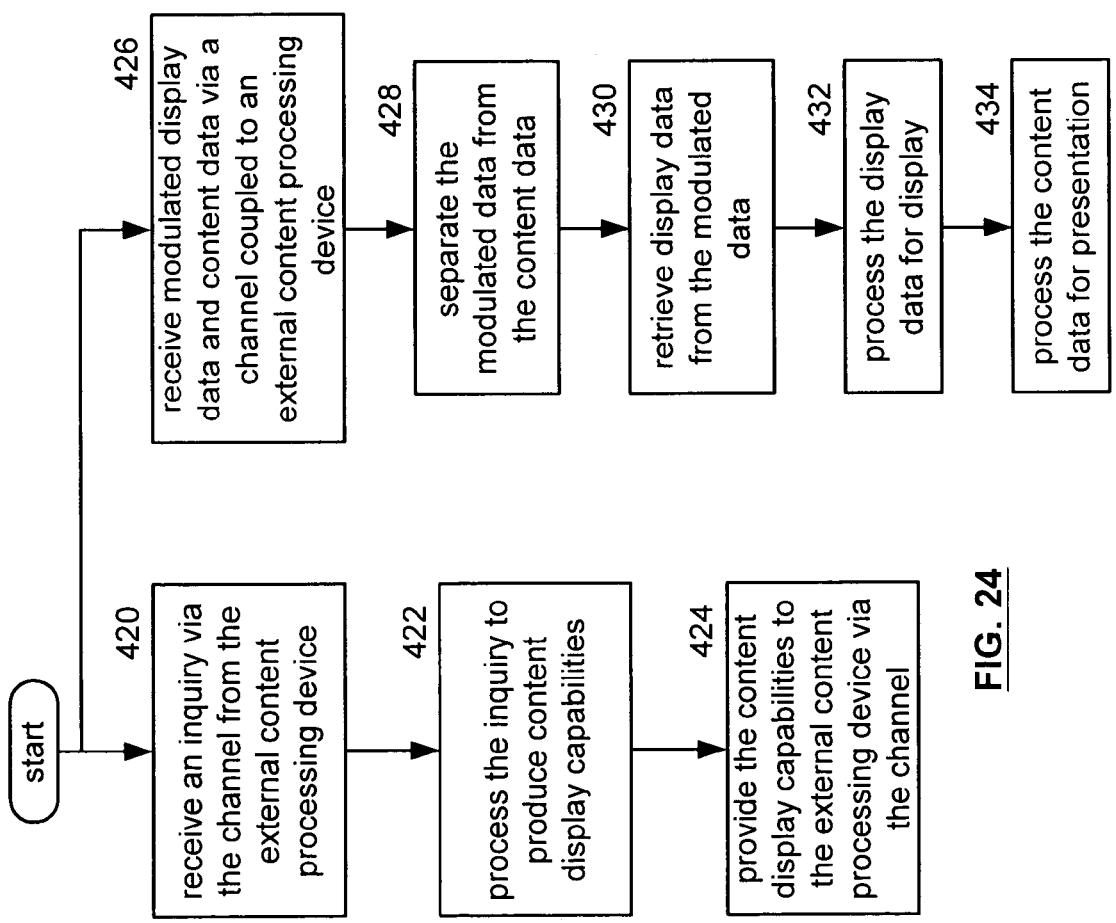
FIG. 24 illustrates a logic diagram of an alternate method for presenting content data and processing data in accordance with the present invention.

FIG. 24 illustrates a logic diagram of an alternate method for processing content data and processing data in accordance with the present invention. The processing begins at Step 420 or 426. At Step 420 an inquiry is received via the channel from the external content processing device. The process then proceeds to Step 422 where the inquiry is processed to produce content display capabilities. The process then proceeds to Step 424 where the content display capabilities are provided to the external content processing device via the channel.

At Step 426, modulated display data and content data are received via a channel coupling the content display device to an external content processing device. The process then proceeds to Step 428 where the modulated data is separated from the content data. The process then proceeds to Step 430 where display data is retrieved from the modulated data. The process then proceeds to Step 432 where the display data is processed for display. The process then proceeds to Step 434 where the content data is processed for presentation.

Figure 25:
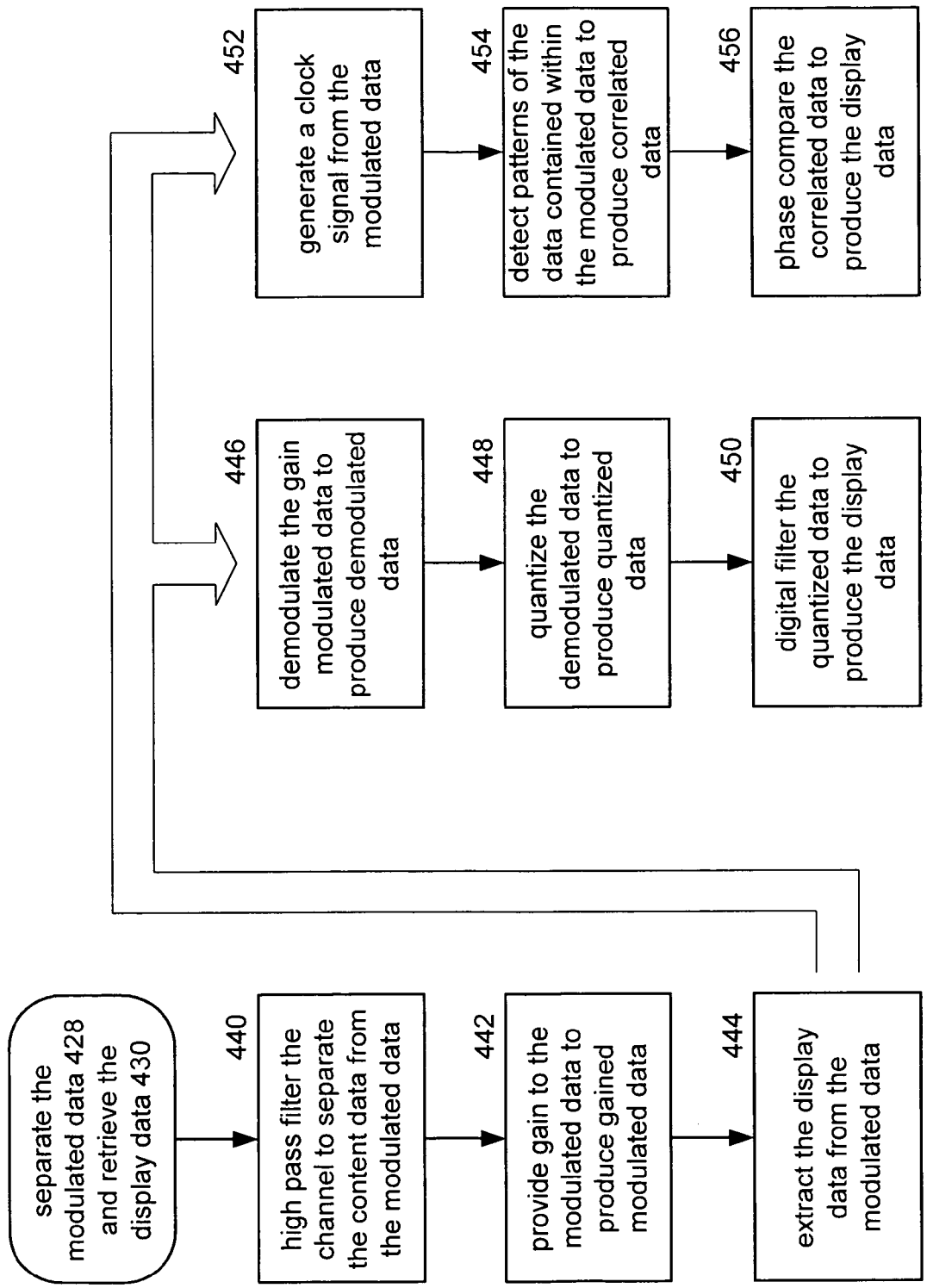
FIG. 25 illustrates a logic diagram of a method for Steps 428 and 430 of FIG. 24.

FIG. 25 illustrates further processing of Steps 428 and 430 of FIG. 24. Such further processing begins at Step 440 where the channel is high pass filtered to separate the content data from the modulated data. The process then proceeds to Step 442 where gain is provided to the modulated data to produce gain modulated data. The process then proceeds to Step 444 where the display data is extracted from the modulated data. The extracting of display data from modulated data may be done in a variety of ways, two of which are shown in Steps 446 through 450 and Steps 452 through 456.

At Step 446, the gain modulated data is demodulated to produce demodulated data. The process then proceeds to Step 448 where the demodulated data is quantized to produce quantized data. The process then proceeds to Step 450 where the quantized data is digitally filtered to produce the display data.

At Step 452, a clock signal is generated from the modulated data. The process then proceeds to Step 454 where patterns of the data contained within the modulated data are detected to produce correlated data. The process then proceeds to Step 456 where the correlated data is phase compared to produce the display data.

The preceding discussion has presented a method and apparatus for minimizing the number of interfaces required to couple a content processing device to a content display device. For example, when the content processing device is an audio player such as a cassette player, DVD player, CD player, et cetera and the content display device is a headphone with a microphone, remote control input circuitry, and a display, only three wires are needed to couple the display device with the processing device. The extra data of remote control device and display information are modulated on the content data (e.g. the audio data). As one of average skill in the art will appreciate, other embodiments may be derived from the teaching of the present invention without deviating from the scope of the claims.

What is claimed is:

1. A content display device for presenting content data and processing data, the content display device comprises:
   data processing circuitry operably coupled to receive inputs regarding functionality of an external content processing device and to process the inputs to produce data regarding the functionality of an external content processing device;
   content display module operably coupled to process the content data for presentation; and
   transceiving module operably coupled to the data processing circuitry and the content display module, wherein the transceiving module receives the content data via a channel coupling the content display device to the external content processing device, wherein the transceiving module modulates the data to produce modulated data and transmits the modulated data to the external content processing device via the channel.

2. The content display device of claim 1, wherein the data processing module further comprises:
   input device operably coupled to receiving an input signal and produce therefrom an analog input signal; and
   digitizing module operably coupled to digitize the analog input signal and to produce a digitized signal, wherein the digitizing module provides the digitized signal as at least part of the data to the transceiving module.

3. The content display device of claim 1, wherein the data comprises at least one of: digitized audio, digitized video, and incoming remote control data and wherein the content data comprises at least one of: audio data, video data, text data, and multimedia data.

4. The content display device of claim 3, wherein the remote control data comprises at least one of: volume adjust data, stop data, play data, pause data, rewind data, fast forward data, next track data, channel up/down data, bass boost data, record data, intensity data, contrast data, security access data, and telephone access code data.

5. The content display device of claim 4, wherein the transceiving module further comprises functionality to receive modulated display data via the channel, wherein the transceiving module separates the modulated display data from the content data, wherein the transceiving module retrieves display data from the modulated display data, and wherein the transceiving module provides the display data to the data processing module.

6. The content display device of claim 5, wherein the transceiving module comprises:
   high pass filter to separate the content data from the modulated display data;
   gain module operably coupled to provide gain to the modulated display data to produce gained modulated data; and
   data extraction circuit operably coupled to retrieve the display data from the modulated display data.

7. The content display device of claim 6, wherein the data extraction circuit comprises:
   demodulator operably coupled to receive the gain modulated data and to produce therefrom demodulated data;
   quantizer operably coupled to receive the demodulated data and to produce therefrom quantized data; and
   digital filter operably coupled to receive the quantized data and produce therefrom the display data.

8. The content display device of claim 6, wherein the data extraction circuit comprises:
- clock recovery circuit operably coupled to generate a clock signal from the modulated display data;
- a correlator operably coupled to receive the clock signal, wherein the correlator detect patterns of the data contained within the modulated display data to produce correlated data; and
- phase comparator operably coupled to receive the correlated data and to produce therefrom the display data.

9. The content display device of claim 5 further comprises:
- display operably coupled to the data processing module, wherein the data processing module processes the display data to produce display information, wherein the display displays the display information.

10. The content display device of claim 1, wherein the transceiving module further comprises:
- data modulator operably coupled to modulate the data to produce the modulated data; and
- injecting circuit operably coupled to inject the modulated data on to the channel such that the modulated data is provided to the external content processing device.

11. The content display device of claim 10, wherein the data modulator comprises:
- pseudo random code generator operably coupled to produce a random code; and
- modulator operably coupled to receive the random code and the data to produce the modulated data.

12. The content display device of claim 10, wherein the injecting circuit comprises:
- high pass filter operably coupled to the channel, wherein the high pass filter filters the modulated data to produce filtered data, wherein the filtered data is provided on the channel; and
- high frequency isolation module operably coupled to the channel, wherein the high frequency isolation module substantially attenuates the filtered data and passes the content data substantially untenanted such that the content data is isolated from the modulated data.

13. The content display device of claim 1 further comprises identifying circuitry operably coupled to receive an inquiry via the channel from the external content processing device, wherein the identifying circuitry processes the inquiry to produce content display capabilities, and wherein the identifying circuitry provides the content display capabilities to the transceiving module for transmission via the channel to the external content processing device.

14. A content display device for presenting content data and processing data, the content display device comprises:
- data processing circuitry operably coupled to process display data received from an external content processing device;
- content display module operably coupled to process content data for presentation; and
- transceiving module operably coupled to the data processing circuitry and the content display module, wherein the transceiving module is operably coupled to receive modulated data via a channel that couples the content display device to the external content processing device, wherein the transceiving module separates the modulated data from the content data, wherein the transceiving module retrieves display data from the modulated data, and wherein the transceiving module provides the display data to the data processing module.

15. The content display device of claim 14, wherein the transceiving module comprises:
- high pass filter to separate the content data from the modulated data;
- gain module operably coupled to provide gain to the modulated data to produce gained modulated data; and
- data extraction circuit operably coupled to retrieve the display data from the modulated data.

16. The content display device of claim 15, wherein the data extraction circuit comprises:
- demodulator operably coupled to receive the gain modulated data and to produce therefrom demodulated data;
- quantizer operably coupled to receive the demodulated data and to produce therefrom quantized data; and
- digital filter operably coupled to receive the quantized data and produce therefrom the display data.

17. The content display device of claim 15, wherein the data extraction circuit comprises:
- clock recovery circuit operably coupled to generate a clock signal from the modulated data;
- a correlator operably coupled to receive the clock signal, wherein the correlator detect patterns of the data contained within the modulated data to produce correlated data; and
- phase comparator operably coupled to receive the correlated data and to produce therefrom the display data.

18. The content display device of claim 14 further comprises:
- display operably coupled to the data processing module, wherein the data processing module processes the display data to produce display information, wherein the display displays the display information.

19. The content display device of claim 14 further comprises identifying circuitry operably coupled to receive an inquiry via the channel from the external content processing device, wherein the identifying circuitry processes the inquiry to produce content display capabilities, and wherein the identifying circuitry provides the content display capabilities to the transceiving module for transmission via the channel to the external content processing device.

20. A method for presenting content data and processing data, the method comprises the steps of:
- receiving inputs regarding functionality of an external content processing device;
- processing the inputs to produce data regarding the functionality of an external content processing device;
- modulating the data to produce modulated data;
- receiving the content data via a channel coupled to the external content processing device;
- transmitting the modulated data to the external content processing device via the channel; and
- processing the content data for presentation.

21. The method of claim 20 further comprises:
- receiving an analog input signal;
- digitizing the analog input signal to produce a digitized signal; and
- providing the digitized signal as at least part of the data for modulating.

22. The method of claim 20 further comprises:
- receiving modulated display data via the channel;
- separating the modulated display data from the content data;
- retrieving display data from the modulated display data; and
- displaying the display data.

23. The method of claim 22, wherein the separating and retrieving further comprise:
  high pass filtering the channel to separate the content data from the modulated display data;
  providing gain to the modulated display data to produce gained modulated data; and
  extracting the display data from the modulated display data.

24. The method of claim 23, wherein the extracting further comprises:
  demodulating the gain modulated data to produce demodulated data;
  quantizing the demodulated data to produce quantized data; and
  digital filtering the quantized data to produce the display data.

25. The method of claim 23, wherein the extracting further comprises:
  generating a clock signal from the modulated display data;
  correlating patterns of the display data contained within the modulated display data to produce correlated data; and
  phase comparing the correlated data and to produce therefrom the data.

26. The method of claim 20, wherein the receiving and transmitting further comprise:
  modulating the data to produce the modulated data; and
  injecting the modulated data on to the channel with the content data and to produce transceive data that is provided to the external content processing device.

27. The method of claim 26, wherein the modulating further comprises:
  generating a pseudo random code; and
  modulating the random code and the data to produce the modulated data.

28. The method of claim 26, wherein the injecting further comprises:
  high pass filtering the modulated data to produce filtered data, wherein the filtered data is provided on the channel; and
  high frequency isolating the content data from the modulated data by substantially attenuating the filtered data and passing the content data substantially untenanted.

29. The method of claim 20 further comprises:
  receiving an inquiry via the channel from the external content processing device;
  processing the inquiry to produce content display capabilities; and
  providing the content display capabilities to the external content processing device via the channel.

30. A method for presenting content data and processing data, the method comprises the steps of:
  receiving modulated display data and content data via a channel coupled to an external content processing device;
  separating the modulated data from the content data;
  retrieving display data from the modulated data;
  processing the display data for display; and
  processing the content data for presentation.

31. The method of claim 30, wherein the separating and retrieving further comprises:
  high pass filtering the channel to separate the content data from the modulated data;
  providing gain to the modulated data to produce gained modulated data; and
  extracting the display data from the modulated data.

32. The method of claim 31, wherein the extracting further comprises:
  demodulating the gain modulated data to produce demodulated data;
  quantizing the demodulated data to produce quantized data; and
  digital filtering the quantized data to produce the display data.

33. The method of claim 31, wherein the extracting further comprises:
  generating a clock signal from the modulated data;
  detecting patterns of the data contained within the modulated data to produce correlated data; and
  phase comparing the correlated data to produce the display data.

34. The method of claim 30 further comprises:
  receiving an inquiry via the channel from the external content processing device;
  processing the inquiry to produce content display capabilities; and
  providing the content display capabilities to the external content processing device via the channel.

* * * * *